US012750540B2

(12) United States Patent
Kikuchi

(10) Patent No.: US 12,750,540 B2
(45) Date of Patent: Sep. 29, 2026

(54) DISTRIBUTION OF VIDEO IN WHICH TIME PERIOD DURING WHICH PRODUCT WAS PRESENTED IS ESTIMATED

(71) Applicant: Rakuten Group, Inc., Tokyo (JP)

(72) Inventor: Ko Kikuchi, Tokyo (JP)

(73) Assignee: Rakuten Group, Inc., Tokyo (JP)

( * ) Notice: Subject to any disclaimer, the term of this patent is extended or adjusted under 35 U.S.C. 154(b) by 438 days.

(21) Appl. No.: 18/008,484

(22) PCT Filed: Jul. 21, 2022

(86) PCT No.: PCT/JP2022/028406
§ 371 (c)(1),
(2) Date: Jan. 16, 2025

(87) PCT Pub. No.: WO2024/018606
PCT Pub. Date: Jan. 25, 2024

(65) Prior Publication Data
US 2025/0211808 A1 Jun. 26, 2025

(51) Int. Cl.
*H04N 21/25* (2011.01)
*H04N 21/2187* (2011.01)
(Continued)

(52) U.S. Cl.
CPC ..... *H04N 21/2542* (2013.01); *H04N 21/2187* (2013.01); *H04N 21/47815* (2013.01); *H04N 21/8456* (2013.01)

(58) Field of Classification Search
CPC .......... H04N 21/812; H04N 21/47815; H04N 21/4722; H04N 21/25891; H04N 21/4532; H04N 21/2542
See application file for complete search history.

(56) References Cited

U.S. PATENT DOCUMENTS 8,341,677 B2 * 12/2012 Padmanabhan ...... H04N 21/812 725/23
2004/0153385 A1 * 8/2004 Allibhoy ............ H04N 21/8106 709/228
(Continued)

FOREIGN PATENT DOCUMENTS

JP 2017-199352 A 11/2017

*Primary Examiner* — Jason Salce
(74) *Attorney, Agent, or Firm* — Sughrue Mion, PLLC

(57) ABSTRACT

A receiver (120) receives, from each of a plurality of terminals being playing a distributed live video, a piece of access information sent in response to an operation on one of a plurality of objects respectively associated with a plurality of products presented in the live video. A collector (142) collects video identification information identifying the live video, product identification information identifying a product associated with the operated object, and time information indicating a playback time of the live video at a point of time at which the operation is performed, the video identification information, the product identification information, and the time information being included in each of the received pieces of access information. An estimator (143) estimates, based on the collected video identification information, product identification information, and time information, a time period during which each of the plurality of products was presented in the live video.

5 Claims, 19 Drawing Sheets

(51) Int. Cl.

| | |
|---|---|
| ***H04N 21/254*** | (2011.01) |
| ***H04N 21/478*** | (2011.01) |
| ***H04N 21/845*** | (2011.01) |

(56) References Cited

U.S. PATENT DOCUMENTS

| | | | | |
|---|---|---|---|---|
| 2005/0235324 | A1* | 10/2005 | Makipaa | H04N 21/858<br>348/E7.071 |
| 2011/0099069 | A1* | 4/2011 | Hoelz | G06Q 30/02<br>725/60 |
| 2012/0167145 | A1* | 6/2012 | Incorvia | H04N 21/47815<br>725/60 |
| 2012/0227073 | A1* | 9/2012 | Hosein | H04N 21/41265<br>725/60 |
| 2012/0266197 | A1* | 10/2012 | Andrews | H04N 21/47815<br>725/60 |
| 2013/0283301 | A1* | 10/2013 | Avedissian | H04N 21/4223<br>725/5 |
| 2014/0215529 | A1* | 7/2014 | Good | H04N 21/8583<br>725/60 |
| 2015/0106856 | A1* | 4/2015 | Rankine | H04N 21/8456<br>725/60 |
| 2015/0208131 | A1* | 7/2015 | Chatter | H04N 21/8133<br>725/60 |
| 2015/0286461 | A1* | 10/2015 | Trammell | H04N 21/8456<br>709/204 |
| 2016/0066051 | A1* | 3/2016 | Caidar | H04N 21/45455<br>725/60 |
| 2019/0379934 | A1* | 12/2019 | Orlowski | H04N 21/258 |

* cited by examiner

FIG. 5

131

| VIDEO ID (131a) | PRODUCT ID (131b) | PRODUCT NAME (131c) | STREAMER ID (131d) | ADDRESS (131e) | ... |
|---|---|---|---|---|---|
| VD-123ABC | PD-AAA123 | PORTABLE GAME MACHINE | ST-ABC | https://***video.com/AbCd1eFgH | ... |
| | PD-BBB234 | PROJECTOR | | | |
| | PD-CCC345 | PORTABLE POWER SUPPLY | | | |
| | : | : | | | |
| VD-234BCD | PD-DDD456 | LIPSTICK | ST-BCD | https://***video.com/BcD2fGhI | ... |
| | PD-EEE567 | FOUNDATION | | | |
| | PD-FFF678 | SUNBLOCK CREAM | | | |
| | : | : | | | |
| VD-345CDE | PD-GGG789 | LAPTOP PC | ST-CDE | https://***video.com/CdE3gHiJ | ... |
| | PD-HHH890 | DISPLAY ARM | | | |
| | PD-I I I 901 | WORKBENCH | | | |
| | : | : | | | |
| : | : | : | : | : | : |

FIG. 6

132

132a 132b 132c

| VIDEO ID | PRODUCT ID | PLAYBACK TIME | ··· |
|---|---|---|---|
| PD-AAA123 | PD-AAA123 | 00:01:01 | ··· |
| PD-AAA123 | PD-AAA123 | 00:01:02 | ··· |
| : | : | : | ··· |
| PD-AAA123 | PD-AAA123 | 00:11:33 | ··· |
| PD-AAA123 | PD-BBB234 | 00:11:33 | ··· |
| PD-AAA123 | PD-BBB234 | 00:11:34 | ··· |
| : | : | : | ··· |
| PD-AAA123 | PD-BBB234 | 00:16:54 | ··· |
| PD-AAA123 | PD-CCC345 | 00:16:54 | ··· |
| PD-AAA123 | PD-CCC345 | 00:16:55 | ··· |
| : | : | : | ··· |

FIG. 7

133

133a 133b 133c 133d 133e

| VIDEO ID | PRODUCT ID | PRODUCT NAME | PLAYBACK TIME | NUMBER OF ACCESSES | ... |
|---|---|---|---|---|---|
| PD-AAA123 | PD-AAA123 | PORTABLE GAME MACHINE | 00:01:01 | 1 | ... |
| | | | 00:01:02 | 2 | |
| | | | 00:01:02 | 4 | |
| | | | : | : | |
| | PD-BBB234 | PROJECTOR | 00:11:33 | 2 | ... |
| | | | 00:11:34 | 3 | |
| | | | 00:11:35 | 6 | |
| | | | : | : | |
| | PD-CCC345 | PORTABLE POWER SUPPLY | 00:16:54 | 1 | ... |
| | | | 00:16:55 | 2 | |
| | | | 00:16:56 | 3 | |
| | | | : | : | |
| | : | : | : | : | ... |

FIG. 8

134

134a

| VIDEO ID |
| --- |
| PD-AAA123 |

| CHAPTER NUMBER (134b) | PLAYBACK TIME (134c) | TITLE (134d) | ADDRESS (134e) | ... |
| --- | --- | --- | --- | --- |
| 1 | 00:01:01 | PORTABLE GAME MACHINE | https://***video.com/AbCd1eFgH?t=61 | ... |
| 2 | 00:11:37 | PROJECTOR | https://***video.com/AbCd1eFgH?t=697 | ... |
| 3 | 00:16:56 | PORTABLE POWER SUPPLY | https://***video.com/AbCd1eFgH?t=1016 | ... |
| : | : | : | : | ... |

DISTRIBUTION OF VIDEO IN WHICH TIME PERIOD DURING WHICH PRODUCT WAS PRESENTED IS ESTIMATED

TECHNICAL FIELD

The present disclosure relates to distribution of a video in which a time period during which a product was presented in the video is estimated.

BACKGROUND ART

In recent years, increasing attention has been paid to electronic commerce referred to as "live commerce". The live commerce is electronic commerce of a form in which a streamer distributes a live video presenting a product and a viewer who is viewing the live video is able to purchase a product presented in the live video.

For example, in Patent Literature 1, a distribution system that allows a streamer of a live video to grasp a situation of viewers in product sales using the live video (live image) is disclosed. In the distribution system, displaying a current state of each viewer (whether the viewer is viewing product information, or is performing purchasing procedure of a product, or has completed purchase of a product, or the like) on a streamer screen enables the streamer to grasp a situation of viewers.

CITATION LIST

Patent Literature

Patent Literature 1: Japanese Patent Application Publication No. 2017-199352

SUMMARY OF INVENTION

Technical Problem

Even after distribution of a live video has been finished, a viewer can often view an archived live video (in other words, a past video). For example, some streamers release live videos that they have distributed in the past as past videos and allow viewers to view the past videos. Among viewers who view such past videos, a large number of viewers desire to, instead of viewing the whole of a past video from beginning to end, view only a portion of the past video. For example, when a plurality of products is presented in a past video, a viewer who has interest in only one product among the presented products tries to view only a portion of the past video in which the product in which the viewer has interest is presented. There are many cases where, to satisfy such desire of viewers, chapter information indicating contents in a past video is registered in, for example, the description or the like of the past video. For example, in chapter information, item rows in each of which a playback time and a title (for example, a name of a product) are associated with each other are arranged. In addition, to each playback time in the chapter information, a link to a playback position within the video indicated by the playback time is added. When a viewer finds a title relating to a product in which the viewer has interest from among such chapter information, the viewer is able to, by performing touch operation on the corresponding playback time, cause the past video to be played back from a scene in which the product is presented.

However, in conventional distribution systems represented by the above-described distribution system in Patent Literature 1, a streamer or the like has been required to manually generate such chapter information. For example, streamers have manually generated chapter information while, after having finished distribution of a live video, reviewing the video again and respectively confirming presented products and playback times at which the products were presented.

Generation of such chapter information has been a heavy burden for streamers or the like. Therefore, when, from information that can be acquired during distribution of a live video, a time period during which a product was presented in the live video can be estimated, it will be possible to automatically generate chapter information from the time period.

The present disclosure has been made to solve the above-described problem, and an objective of the present disclosure is to provide distribution of a video in which a time period during which a product was presented in the video is estimated.

Solution to Problem

A server device according to a first aspect of the present disclosure includes one or more processors, in which at least one processor of the one or more processors executes processing of:

receiving, from each of a plurality of terminals which are playing a distributed live video, a piece of access information sent in response to an operation on one of a plurality of objects respectively associated with a plurality of products presented in the live video;

collecting video identification information identifying the live video, product identification information identifying a product associated with the operated object, and time information indicating a playback time of the live video at the time of operation being performed on the object, the video identification information, the product identification information, and the time information being included in each of the received pieces of access information; and estimating, based on the collected video identification information, product identification information, and time information, a time period during which each of the plurality of products was presented in the live video.

An estimation method according to a second aspect of the present disclosure includes by a computer:

receiving, from each of a plurality of terminals which are playing a distributed live video, a piece of access information sent in response to an operation on one of a plurality of objects respectively associated with a plurality of products presented in the live video;

collecting video identification information identifying the live video, product identification information identifying a product associated with the operated object, and time information indicating a playback time of the live video at the time of operation being performed on the object, the video identification information, the product identification information, and the time information being included in each of the received pieces of access information; and estimating, based on the collected video identification information, product identification information, and time information, a time period during which each of the plurality of products was presented in the live video.

A distribution system according to a third aspect of the present disclosure is a distribution system including: a server device; and a plurality of terminals, in which at least one processor of one or more processors included in the server device executes processing of:

receiving, from each of the plurality of terminals which are playing a distributed live video, a piece of access information sent in response to an operation on one of a plurality of objects respectively associated with a plurality of products presented in the live video;

collecting video identification information identifying the live video, product identification information identifying a product associated with the operated object, and time information indicating a playback time of the live video at the time of operation being performed on the object, the video identification information, the product identification information, and the time information being included in each of the received pieces of access information; and estimating, based on the collected video identification information, product identification information, and time information, a time period during which each of the plurality of products was presented in the live video.

Advantageous Effects of Invention

The present disclosure enables distribution of a video in which a time period during which a product was presented in the video is estimated to be provided.

BRIEF DESCRIPTION OF DRAWINGS

FIG. 5 is a schematic diagram illustrating an example of video management information;

FIG. 6 is a schematic diagram illustrating an example of access history information;

FIG. 7 is a schematic diagram illustrating an example of collected information;

FIG. 8 is a schematic diagram illustrating an example of chapter management information;

DESCRIPTION OF EMBODIMENTS

Figure 1:
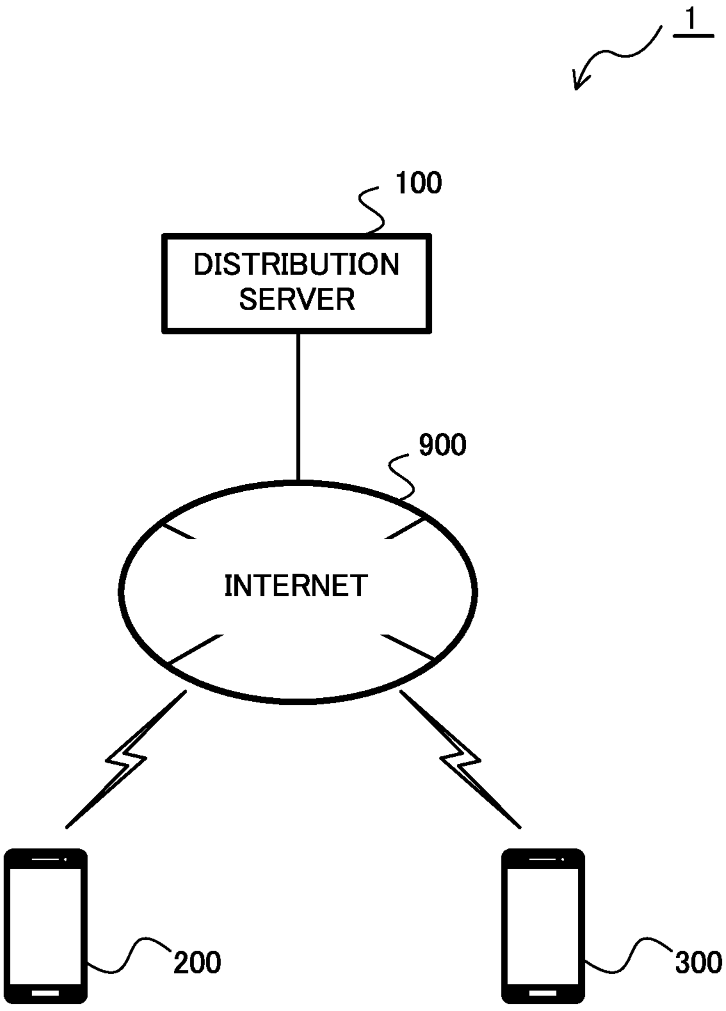
FIG. 1 is a schematic diagram illustrating an example of an overall configuration of a distribution system according to Embodiment 1 of the present disclosure.

Embodiments of the present disclosure are described below in detail with reference to the drawings. Note that, in the drawings, the same reference signs are assigned to the same or equivalent constituent elements. In addition, it is assumed that a term “product”, which is described below, covers not only a physical product but also an electronic product (for example, electronic money, software, such as a game, that is sold in a downloadable format and the right of use thereof, an electronic item, or the like). That is, the embodiments to be described below are for explaining the present disclosure, not for limiting the scope of the present disclosure. Accordingly, it is possible for a person skilled in the art to employ embodiments in which part or all of the elements of the embodiments are replaced by equivalents thereof, which are also included in the scope of the present disclosure.

Embodiment 1

FIG. 1 is a schematic diagram illustrating an example of an overall configuration of a distribution system 1 according to Embodiment 1 of the present disclosure. In the distribution system 1, a distribution server 100 that distributes a live video, a streamer terminal 200 that is used by a streamer, and a viewer terminal 300 that is used by a viewer are connected to one another in a communicable manner via the Internet 900, as an example. Note that it is assumed that a large number of streamer terminals 200 and a large number of viewer terminals 300 exist according to the number of streamers and the number of viewers who use the system, respectively.

The distribution server 100 is, for example, a server device (computer used as a server, or the like) and distributes a live video provided by a streamer to a viewer terminal 300. Note that, as described later, an object (button objects BT1 to BT6, to be described later, or the like) to accept, from a viewer, purchase or the like of a product that a streamer presents is synthesized to a live video. In addition, when, in a viewer terminal 300, an object synthesized to a live video is operated by a viewer, the distribution server 100 receives access information (details are to be described later) sent from the viewer terminal 300. The distribution server 100 accumulates access information received from a plurality of viewer terminals 300 during distribution of a live video and, for example, after the distribution of the live video, estimates a time period during which a product was presented in the live video by collecting necessary information from the accumulated access information.

Each streamer terminal 200 is a terminal, such as a personal computer (PC), a smartphone, and a tablet, and is used by a streamer who performs live distribution. For example, the streamer captures a live video for presenting a product. In addition, the streamer terminal 200 synthesizes to the live video an object to accept purchase or the like of the product from a viewer. The streamer terminal 200 providing the distribution server 100 with the live video to which the object is synthesized causes the live video to be distributed from the distribution server 100 to a viewer terminal 300.

Each viewer terminal 300 is a terminal, such as a smartphone, a tablet, and a PC, and is used by a viewer who views a distributed live video. For example, the viewer starts a video viewing app (or a browser app) in the viewer terminal 300 and, after logging in to the distribution server 100 and the like, views a live video distributed from the distribution server 100. When the viewer desires to purchase a product that a streamer presents in the live video that the viewer is viewing or desires to know details of the product, the viewer is to operate an object synthesized to the live video. Note that, to an object, link information is added, as described later. Therefore, when the object is operated, the viewer terminal 300 accesses the distribution server 100 in accordance with the link information and, after sending access information, to be described later, to the distribution server 100, is redirected to, for example, a predetermined sales server.

(Outline Configuration of Information Processing Device 400)

A typical information processing device 400 by which the distribution server 100, each of the streamer terminals 200, and each of the viewer terminals 300 according to Embodiment 1 are achieved is described.

Figure 2:
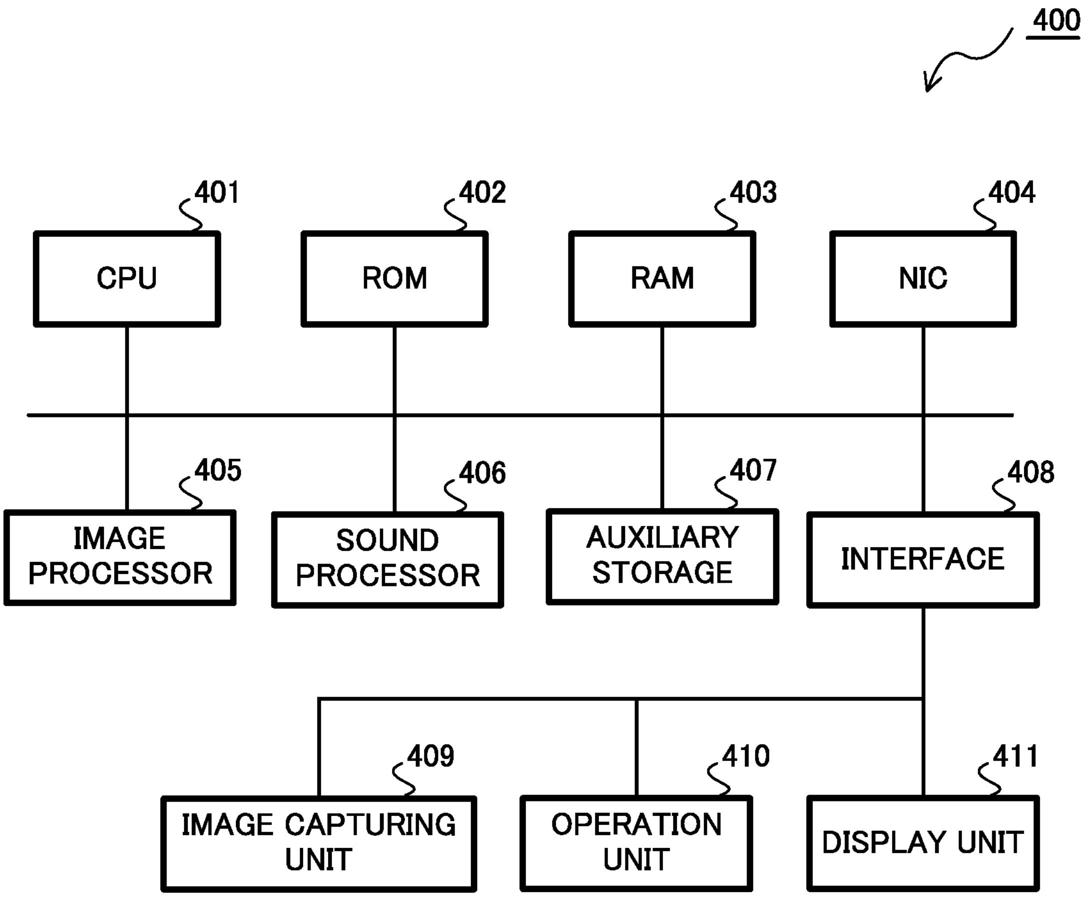
FIG. 2 is a block diagram illustrating an example of an outline configuration of a typical information processing device by which a management server and the like are achieved.

The information processing device 400 includes, as illustrated in FIG. 2, a central processing unit (CPU) 401, a read only memory (ROM) 402, a random access memory (RAM) 403, a network interface card (NIC) 404, an image processor 405, a sound processor 406, an auxiliary storage 407, an interface 408, an image capturing unit 409, an operation unit 410, and a display unit 411.

The CPU 401 controls operation of the entire information processing device 400, and is connected to the respective constituent elements and exchanges control signals and data with the constituent elements.

In the ROM 402, an initial program loader (IPL), which is executed immediately after power-on, is recorded, and, by the IPL being executed, programs stored in the auxiliary storage 407 are read into the RAM 403 and execution of the programs by the CPU 401 is started.

The RAM 403 is a memory device for temporarily recording data and programs, and, in the RAM 403, programs and data read from the auxiliary storage 407 and, in addition thereto, data required for communication and the like are stored.

The NIC 404 is a device for connecting the information processing device 400 to a computer communication network, such as the Internet, and includes a circuit conforming to the 10BASE-T/100BASE-T standard that is used when a local area network (LAN) is constructed, an analog modem for establishing a connection to the Internet using a telephone line, an integrated services digital network (ISDN) modem, an asymmetric digital subscriber line (ADSL) modem, a cable modem for establishing a connection to the Internet using a cable television line, or the like.

The image processor 405 processes image data read from the auxiliary storage 407 or the like, using an image calculation processor (not illustrated) that the CPU 401 or the image processor 405 includes, and subsequently records the processed image data in a frame memory (not illustrated) that the image processor 405 includes. Image data recorded in the frame memory are converted to a video signal at a predetermined synchronization timing, and the video signal is output to the display unit 411 via the interface 408 and the like. In other words, under the control of the CPU 401, the image processor 405 generates an image required in advancing processing performed by the information processing device 400 and causes the display unit 411 to display the image.

The sound processor 406 converts music data and voice data read from the auxiliary storage 407 or the like to a sound signal and outputs the sound signal to the outside via the interface 408 and the like. Note that, when the information processing device 400 includes a speaker thereinside, the sound processor 406 outputs the converted sound signal to the speaker. In other words, under the control of the CPU 401, the sound processor 406 generates a music sound and a voice required to be generated in advancing processing performed by the information processing device 400 and causes the music sound and the like to be output from an internal or external speaker.

The auxiliary storage 407 is a hard disk, a solid state drive (SSD), or the like and stores various types of programs and a various types of data required for operation control of the entire information processing device 400. For example, in the auxiliary storage 407, programs for achieving the distribution server 100 and the like according to the embodiments are stored. Under the control of the CPU 401, the auxiliary storage 407 appropriately reads stored programs and data and causes the RAM 403 or the like to temporarily store the read programs and data.

The interface 408 conforms to a standard, such as HDMI (registered trademark), universal serial bus (USB), and inter-integrated circuit (I2C), and, to the interface 408, the image capturing unit 409, the operation unit 410, and the display unit 411 are connected. Note that the interface 408 may send and receive necessary information to and from a connected external device in addition to the units.

The image capturing unit 409 includes, for example, a single focus lens and an imaging element (a complementary metal oxide semiconductor (CMOS) or a charge coupled device (CCD)) of a predetermined number of pixels and captures a still image or a video.

The operation unit 410 accepts operation input from an operator or the like who uses the information processing device 400.

The display unit 411 draws an image corresponding to image data output by the image processor 405 and presents the image to a worker or the like who uses the information processing device 400.

In addition, the information processing device 400 may be configured to include, in place of the auxiliary storage 407, a drive unit of a digital versatile disc (DVD)-ROM or the like. In this case, the information processing device 400 reads programs and data from a DVD-ROM or the like mounted on the drive unit and operates in the same manner as described above.

Functions and the like of the distribution server 100, each of the streamer terminals 200, and each of the viewer terminals 300 that are achieved by the above-described information processing device 400, are described below with reference to FIGS. 3 to 15. When the information processing device 400 is powered on, programs that cause the information processing device 400 to function as the distribution server 100, the streamer terminal 200, or the viewer terminal 300 according to Embodiment 1 are executed, and the distribution server 100, the streamer terminal 200, or the viewer terminal 300 according to Embodiment 1 is achieved.

(Functional Configuration of Distribution Server 100)

Figure 3:
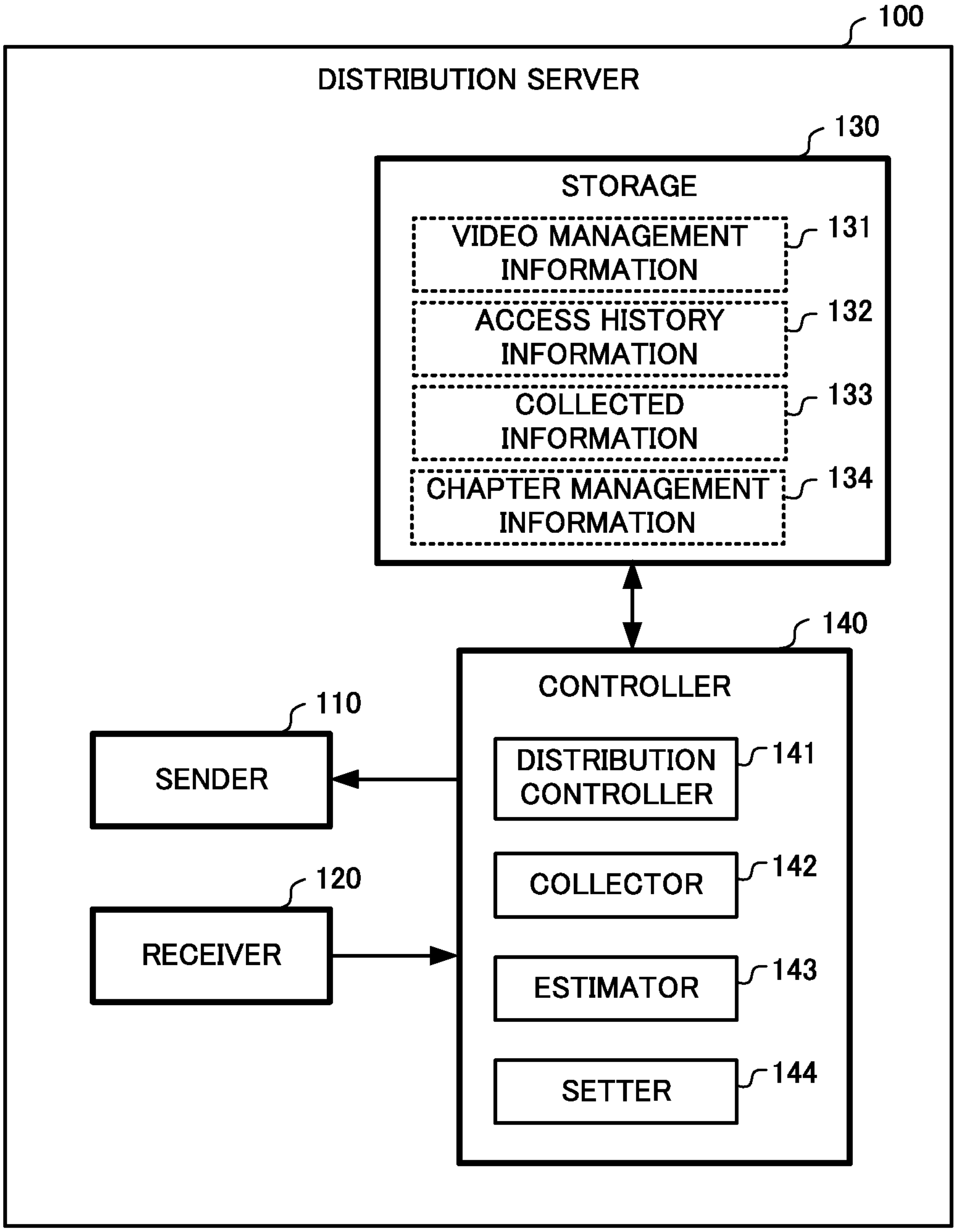
FIG. 3 is a block diagram illustrating an example of a functional configuration of a distribution server according to Embodiment 1.

FIG. 3 is a block diagram illustrating an example of a functional configuration of the distribution server 100 according to Embodiment 1. As illustrated, the distribution server 100 includes a sender 110, a receiver 120, a storage 130, and a controller 140.

Figure 4:
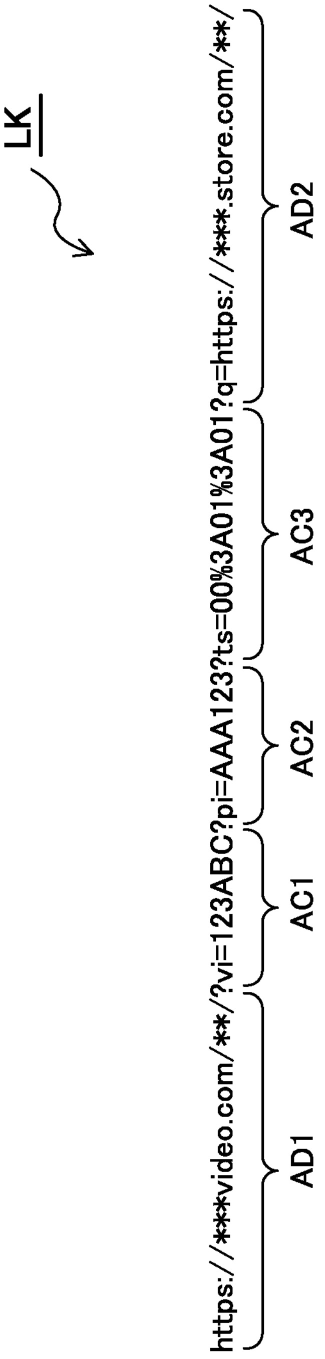
FIG. 4 is a schematic diagram for a description of a configuration of link information.

The sender 110 sends various types of information addressed to a viewer terminal 300 and the like via the Internet 900. For example, when the receiver 120 receives a live video provided by a streamer terminal 200, the sender 110, controlled by the controller 140 (distribution controller 141, to be described later), distributes the received live video to a viewer terminal 300. An object (button objects BT1 to BT6, to be described later, or the like) to accept, from a viewer, purchase or the like of a product that a streamer presents is synthesized to the live video. In addition, for example, link information LK as illustrated in FIG. 4 is added to the object. In the link information LK, address information AD1 indicating an address of the distribution server 100, pieces of access information AC1 to AC3, and address information AD2 indicating an address of a predetermined sales server, which serves as a final transition destination (redirect destination), are included. Note that the access information AC1 is identification information of a live video. In addition, the access information AC2 is identification information of a product serving as a target of purchase or the like. The access information AC3 is a playback time of the live video at a point of time when the object is operated, and is configured to be, for example, dynamically added by a viewer terminal 300 at the point of time when the object is operated. Specifically, when an object synthesized to a live video is operated by a viewer, since access to the distribution server 100 from a viewer terminal 300 is performed in accordance with such link information LK, the receiver 120 is to receive the pieces of access information AC1 to AC3 and the address information AD2 as arguments. The sender 110, by sending response information acquired from the sales server, which was accessed in accordance with the address information AD2 received as an argument, to the viewer terminal 300, redirects the viewer terminal 300 to the sales server. Note that the afore-described NIC 404 can function as the sender 110 as described above.

Returning to FIG. 3, the receiver 120 receives various types of information sent from a streamer terminal 200 and a viewer terminal 300 via the Internet 900. For example, the receiver 120 receives a live video provided by a streamer terminal 200. In addition, the receiver 120 receives access information and the like sent from a viewer terminal 300 when an object synthesized to a live video that the sender 110 is distributing to the viewer terminal 300 is operated by a viewer. In other words, the receiver 120 receives pieces of access information AC1 to AC3 and address information AD2 as illustrated in the above-described FIG. 4 as arguments. Note that the afore-described NIC 404 can function as the receiver 120 as described above.

The storage 130 stores various types of information required for processing in the distribution server 100. For example, the storage 130 stores video management information 131, access history information 132, collected information 133, and chapter management information 134.

The video management information 131 is information to manage a distributed live video and includes, as an example, information as illustrated in FIG. 5. Specifically, in the video management information 131, pieces of information, such as a video ID 131*a*, a product ID 131*b*, a product name 131*c*, a streamer ID 131*d*, and an address 131*e*, are included. Note that the address 131*e* is a uniform resource locator (URL) to view a live video. In addition, in FIG. 5, a case where a plurality of products is presented in a live video is illustrated as an example.

The access history information 132 is information in which access information (pieces of access information AC1 to AC3) that the above-described receiver 120 received is accumulated, and includes, as an example, information as illustrated in FIG. 6. Specifically, in the access history information 132, pieces of information, such as a video ID 132*a*, a product ID 132*b*, and a playback time 132*c*, are included. Note that the video ID 132*a* is identification information of a live video that has an object therein having been operated by a viewer. The product ID 132*b* is identification information of a product corresponding to an operated object. The playback time 132*c* is a playback time of a live video at a point of time when an object was operated. Note that, in the present disclosure, the "playback time" indicates time information using a certain point of time in a video as a reference (for example, elapsed time from the start time point of the video).

The collected information 133 is information in which, for example, after distribution of a live video was finished, the above-described access history information 132 is collected by the controller 140 (a collector 142, to be described later), and includes, as an example, information as illustrated in FIG. 7. Specifically, in the collected information 133, pieces of information, such as a video ID 133*a*, a product ID 133*b*, a product name 133*c*, a playback time 133*d*, and the number of accesses 133*e*, are included. Note that the product name 133*c* is set from a corresponding product name 131*c* in the video management information 131, which is referred to by the controller 140. In addition, in each of the numbers of accesses 133*e*, one of the numbers of accesses (the numbers of pieces of access information) at playback times (playback times 133*d*) that were collected with respect to the same product (the same product ID 133*b*) by the controller 140 is set. Therefore, in the collected information 133, the numbers of accesses with respect to playback times (playback times 133*d*), which are grouped for each product (each product ID 133*b*), in the same live video (the same video ID 133*a*) are collected. Note that, as described later, the controller 140 may be configured to successively collect such collected information 133 during distribution of a live video.

The chapter management information 134 is information generated by the controller 140 (setter 144, to be described later) to manage chapters to divide a live video and includes, as an example, information as illustrated in FIG. 8. Specifically, in the chapter management information 134, pieces of information, such as a video ID 134*a*, a chapter number 134*b*, a playback time 134*c*, a title 134*d*, and an address 134*e*, are included. Note that the playback time 134*c* is time information indicating a start position of a chapter in a live video. In addition, the title 134*d* is a character string to identify a chapter. Note that, in FIG. 8, a case where a name of a product presented in each of the chapters is set as the title 134*d* is illustrated. The address 134*e* is a URL to view a live video by specifying the start position of a chapter.

Note that "?t=61" or the like appended to the end of a URL is an example of an argument and, for example, defines that viewing is to be started from a position to which the video has advanced from the beginning of the live video when 61 seconds (a value indicated in seconds to which the value of the playback time 134*c* is converted) have elapsed.

The storage 130 stores, in addition to the above-described information, various types of information required for processing performed by the controller 140. For example, the storage 130 stores an ID, a password, and the like of a viewer who uses a viewer terminal 300. The storage 130 also saves (records) a live video in parallel with distribution of the live video. In other words, the controller 140 (distribution controller 141, to be described later), while distributing a live video, saves the live video in the storage 130. Because of this configuration, as described later, when a viewer who has belatedly started viewing a live video initiates so-called chasing playback in order to view the video from a scene that the viewer missed, the controller 140 is capable of, even during distribution of the live video, performing distribution using a part of the live video that has been saved in the storage 130. In addition, when, after distribution of a live video was finished, a viewer initiates on-demand playback of the live video (past video), the controller 140 is capable of performing distribution using the live video saved in the storage 130. Note that the afore-described auxiliary storage 407 or the like can function as the storage 130 as described above.

Returning to FIG. 3, the controller 140 controls the entire distribution server 100. The controller 140 includes, for example, a distribution controller 141, a collector 142, an estimator 143, and a setter 144.

The distribution controller 141 distributes a live video received from a streamer terminal 200 to a viewer terminal 300. That is, when the receiver 120 receives a live video provided by a streamer terminal 200, the distribution controller 141 controls the sender 110 to distribute the received live video to a viewer terminal 300. In addition, the distribution controller 141, while distributing a live video to a viewer terminal 300, saves the live video in the storage 130. In addition, when, after the controller 140 (the setter 144, to be described below) has set a chapter in a live video, a viewer initiates chasing playback or on-demand playback of the live video, the distribution controller 141 displays the chapter on a seek bar, which indicates a playback position of the live video. Because of this configuration, by, in addition to performing operation on chapter information (chapter information CD displayed in a summary area SA, to be described later), to be described later, moving the seek bar to a chapter, the viewer can view the live video from the start position of the chapter.

The collector 142 causes the storage 130 to store access information (pieces of access information AC1 to AC3) that the receiver 120 received from a viewer terminal 300 by adding the access information to the access history information 132 as illustrated in the above-described FIG. 6. In addition, the collector 142, for example, after distribution of a live video was finished, collects access history information 132 and generates collected information 133 as illustrated in the above-described FIG. 7. In other words, the collector 142 collects the numbers of accesses with respect to playback times (playback times 133*d*), which are grouped for each product (each product ID 133*b*), in the same live video (the same video ID 133*a*). Note that, as described later, the collector 142 may be configured to successively generate the collected information 133 during distribution of a live video.

The estimator 143 estimates, based on the collected information 133 that the above-described collector 142 collected, a time period during which each product was presented in a live video. This estimation uses a tendency that a viewer who is viewing a live video is highly likely to, while a product is being presented, operate an object (button objects BT1 to BT6, to be described later, or the like) to request purchase or the like of the product. Specifically, the estimator 143 calculates a distribution of the numbers of accesses (the numbers of accesses 133*e* in FIG. 3) with respect to playback times (playback times 133*d* in FIG. 3) from the collected information 133, which was collected by the collector 142, and estimates a time period during which a product was presented in the live video, based on the calculated distribution of the numbers of accesses.

Figure 9:
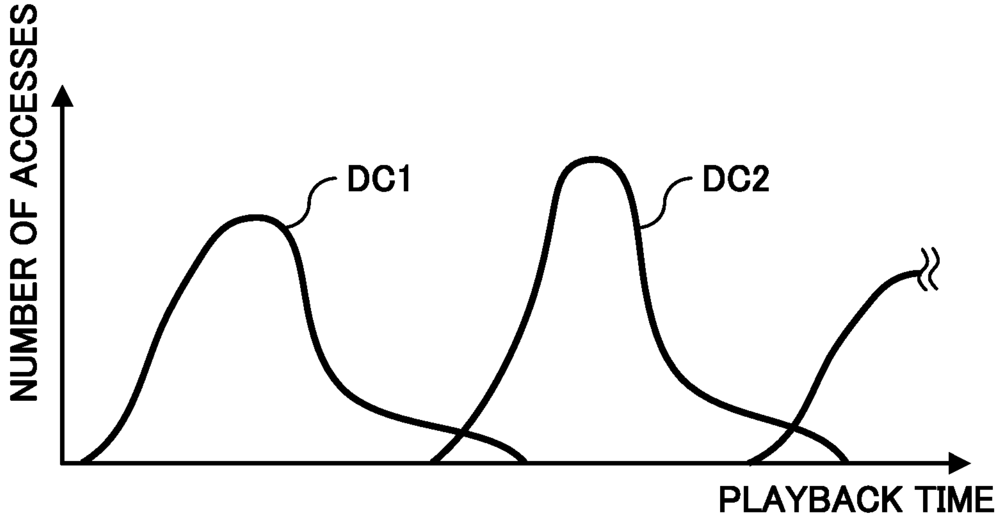
FIG. 9 is a schematic diagram illustrating an example of distribution curves.
Figure 10:
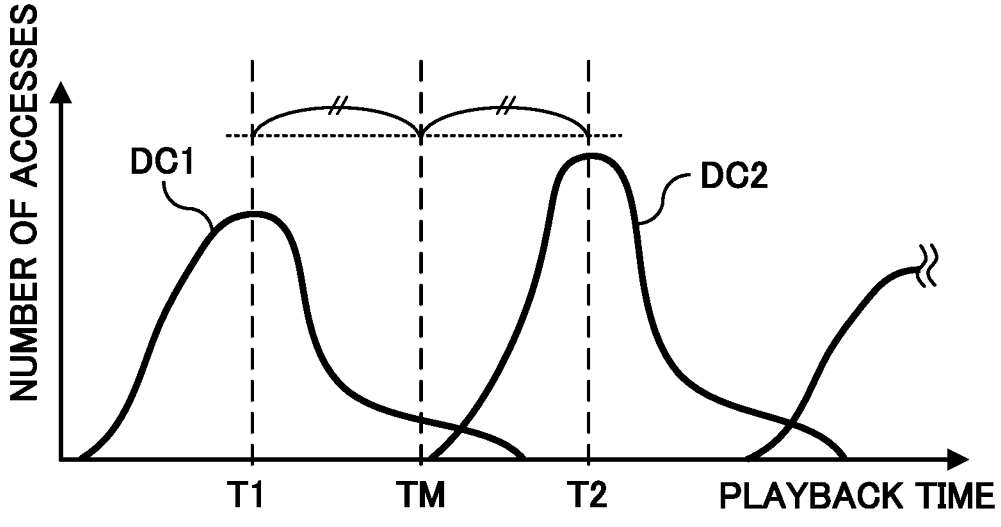
FIG. 10 is a schematic diagram illustrating an example of a method for calculating a boundary between distribution curves adjacent to each other.
Figure 11:
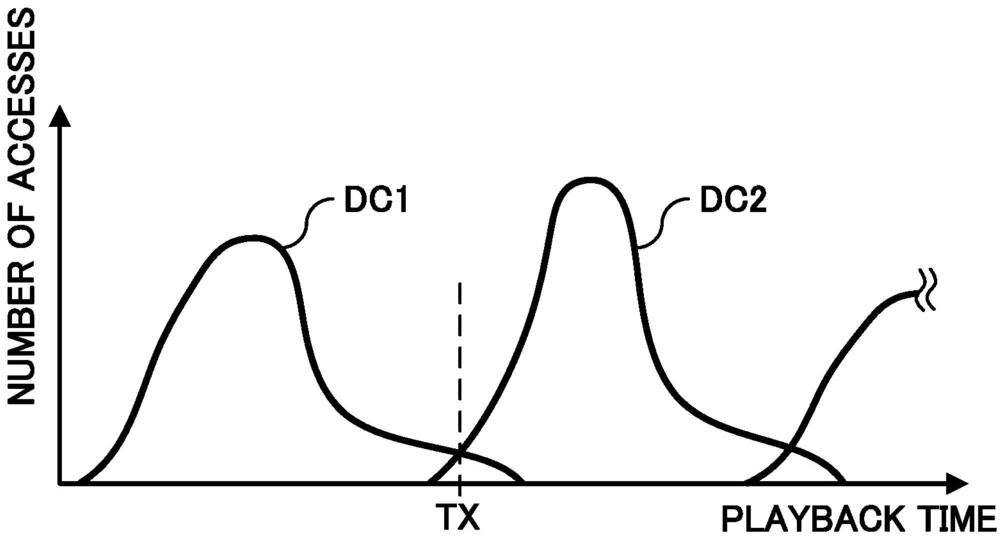
FIG. 11 is a schematic diagram illustrating an example of another method for calculating a boundary between distribution curves adjacent to each other.

In more detail, the estimator 143 calculates distribution curves DC1, DC2, and the like of respective products, as illustrated in FIG. 9, from the collected information 133. The estimator 143, by determining each boundary between distribution curves adjacent to each other on the time axis (for example, between the distribution curve DC1 and the distribution curve DC2), estimates a time period during which each product was presented. Note that the estimator 143 uses, for example, peaks of distribution curves adjacent to each other on the time axis to determine a boundary. Specifically, the estimator 143 calculates a playback time TM that is the middle point between a playback time T1 at which the distribution curve DC1 has a peak and a playback time T2 at which the distribution curve DC2 has a peak, and determines the playback time TM as a boundary, as illustrated in FIG. 10. In addition to this method, the estimator 143 may use, for example, a point at which distribution curves adjacent to each other on the time axis cross each other to determine a boundary. Specifically, the estimator 143 determines a playback time TX that is a point at which the distribution curve DC1 and the distribution curve DC2 cross each other as a boundary, as illustrated in FIG. 11. Note that these methods for determining a boundary are only examples and a boundary between distribution curves adjacent to each other on the time axis may be determined using another determination method. The estimator 143, by determining a boundary between distribution curves adjacent to each other on the time axis in this way, estimates a time period during which a product was presented in a live video. In other words, a determined boundary serves as the termination time of a time period during which one product (preceding product) was presented and at the same time serves as the commencement time of a time period during which the other product (succeeding product) was presented. Note that, since, regarding a product that was presented first in a live video, the commencement time of a time period during which the product was presented cannot be acquired from a boundary, the estimator 143, for example, estimates a playback time at which the number of accesses first reaches a predetermined value on a distribution curve of the first product as the commencement time of the time period during which the product was presented. Likewise, since, regarding a product that was presented last in a live video, the termination time of a time period during which the product was presented cannot be acquired from a boundary, the estimator 143, for example, estimates a playback time at which the number of accesses first falls to less than or equal to a predetermined value after having reached a peak on a distribution curve of the last product as the termination time of the time period during which the product was presented.

Returning to FIG. 3, the setter 144 sets, based on respective time periods that the above-described estimator 143 estimated, a chapter to divide a live video. For example, the setter 144 sets a chapter by generating, based on respective time periods that the estimator 143 estimated, chapter management information 134 as illustrated in the above-described FIG. 8 and adding the generated chapter management information 134 to summary information of the live video.

More specifically, the following description is made using a case where the chapter management information 134 illustrated in FIG. 8 is generated as an example. Note that it is assumed that the estimator 143 estimates, in a live video, a time period during which the first product (for example, a portable game machine) was presented to be "00:01:01 to 00:11:37", a time period during which the second product (for example, a projector) was presented to be "00:11:37 to 00:16:56", and a time period during which the third product (for example, a portable power supply) was presented to be "00:16:56 to 00:22:49". In this case, the setter 144 first sets information about the portable game machine, which is the first product, in the first record in the chapter management information 134. Specifically, the setter 144 sets "1" in the chapter number 134*b* and "00:01:01", which is the commencement time of the time period concerning the first product, in the playback time 134*c*. The setter 144 also sets "portable game machine" in the title 134*d* and "https://*video.com/AbCd1eFgH?t=61" in the address 134***e*. Note that "?t=61" indicates that playback of the video is to be started from a position to which the video has advanced from the beginning of the video when 61 seconds have elapsed. Next, the setter 144 sets information about the projector, which is the second product, in the second record in the chapter management information 134. Specifically, the setter 144 sets "2" in the chapter number 134*b* and "00:11:37", which is the commencement time of the time period concerning the second product, in the playback time 134*c*. The setter 144 also sets "projector" in the title 134*d* and "https://*video.com/AbCd1eFgH?t=697" in the address 134***e*. Last, the setter 144 sets information about the portable power supply, which is the third product, in the third record in the chapter management information 134. Specifically, the setter 144 sets "3" in the chapter number 134*b* and "00:16:56", which is the commencement time of the time period concerning the third product, in the playback time 134*c*. The setter 144 also sets "portable power supply" in the title 134*d* and "https://*video.com/AbCd1eFgH?t=1016" in the address 134***e*. The setter 144 sets chapters by adding the chapter management information 134 generated in this way to the summary information about the live video.

The above-described CPU 401 or the like can function as the controller 140 having a configuration as described above.

(Functional Configuration of Streamer Terminal 200)

Figure 12:
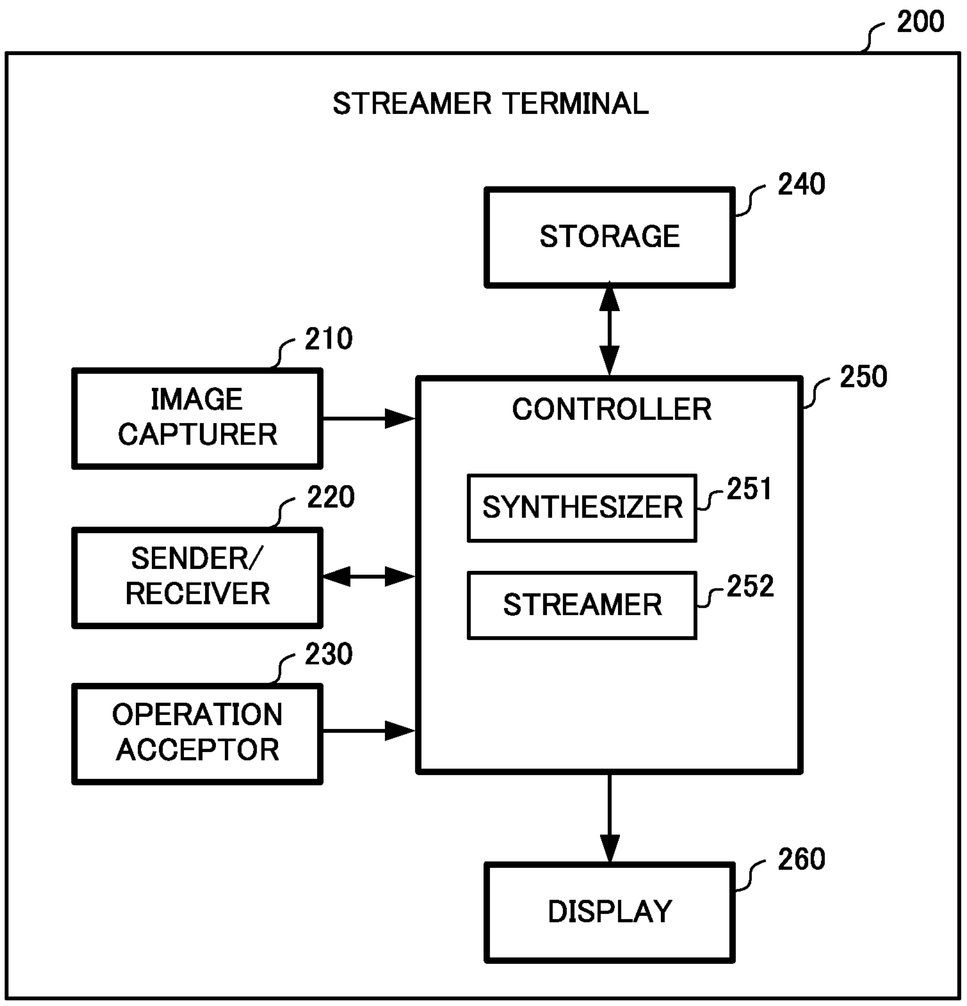
FIG. 12 is a block diagram illustrating an example of a functional configuration of a streamer terminal.

FIG. 12 is a block diagram illustrating an example of a functional configuration of each streamer terminal 200. As illustrated, the streamer terminal 200 includes an image capturer 210, a sender/receiver 220, an operation acceptor 230, a storage 240, a controller 250, and a display 260.

The image capturer 210 is, for example, a camera arranged in the streamer terminal 200 and captures a video of the streamer and the like during distribution. In other words, the image capturer 210 outputs an image including the streamer during distribution. Note that the afore-described image capturing unit 409 can function as the image capturer 210 as described above.

The sender/receiver 220 sends and receives various types of information to and from the distribution server 100 via the Internet 900. For example, the sender/receiver 220, controlled by the controller 250 (streamer 252, to be described later), sends a live video in which an object is synthesized to an image captured by the image capturer 210 to the distribution server 100 (distributes the live video to a viewer terminal 300 via the distribution server 100). Note that the afore-described NIC 404 can function as the sender/receiver 220 as described above.

The operation acceptor 230 is a touch panel or a pointing device and accepts various types of operations from the streamer. For example, the operation acceptor 230 accepts an operation to select an object to be synthesized to an image captured by the image capturer 210. Note that the afore-described operation unit 410 can function as the operation acceptor 230 as described above.

The storage 240 stores various types of information required for processing in the streamer terminal 200. For example, the storage 240 stores information on an object to be synthesized to a captured image, a synthesis position of the object, and the like. As an example, the object is a button object (button objects BT1 to BT6, to be described later, or the like) to accept, from a viewer, purchase or the like of a product that the streamer presents in a live video. In addition, the synthesis position is a position at which an object is synthesized within an image. Note that the afore-described auxiliary storage 407 or the like can function as the storage 240 as described above.

The controller 250 controls the entire streamer terminal 200. The controller 250 includes, for example, a synthesizer 251 and a streamer 252.

Figure 13:
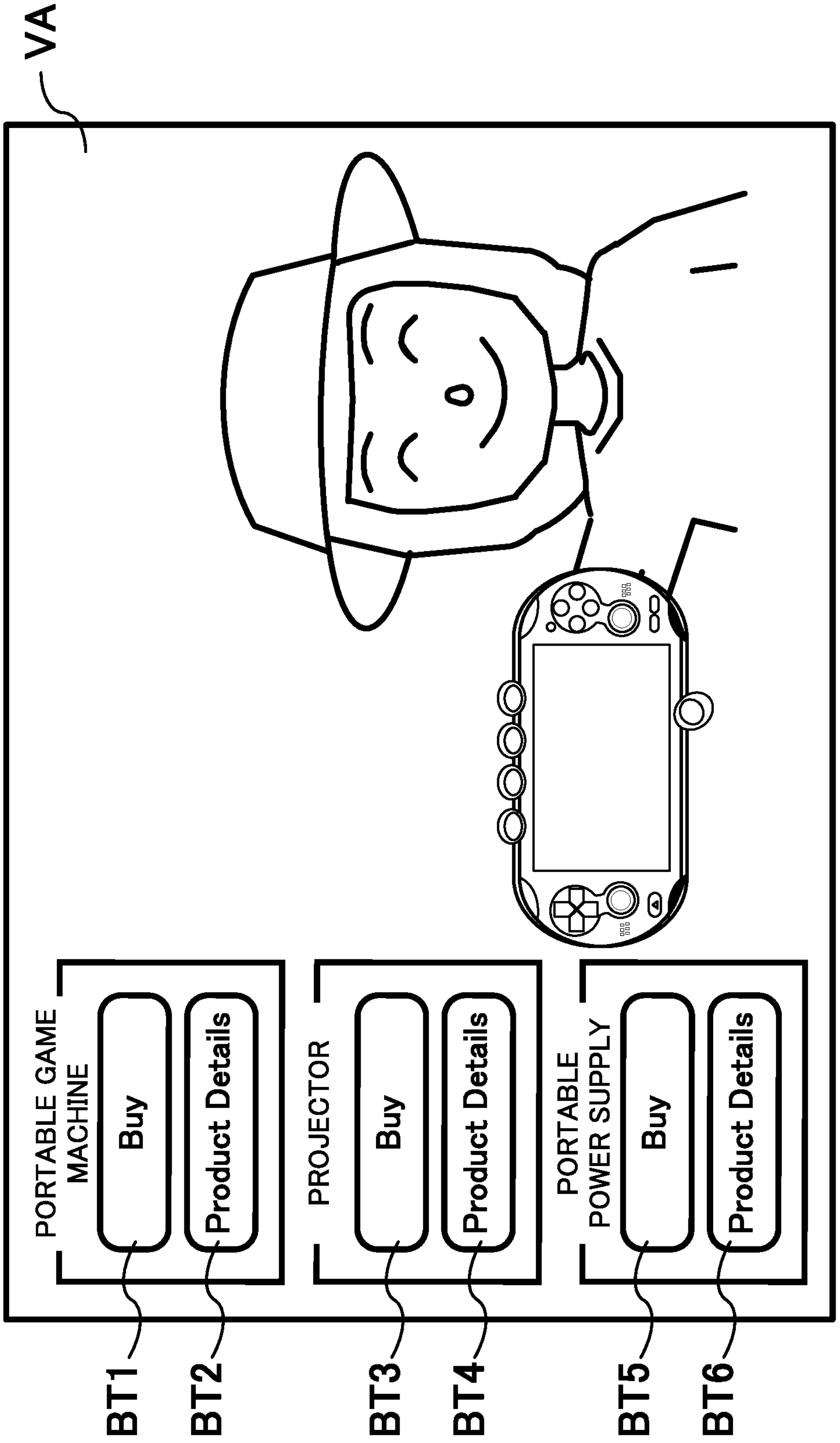
FIG. 13 is a schematic diagram illustrating an example of a live video to which a plurality of button objects is synthesized.

The synthesizer 251 synthesizes an object within an image captured by the image capturer 210. For example, the synthesizer 251 synthesizes button objects BT1 to BT6 within an image VA in accordance with information of the objects and synthesis positions, which are stored in the storage 240, as illustrated in FIG. 13. The button objects BT1, BT3, and BT5 are objects to accept purchase of products (for example, a portable game machine, a projector, and a portable power supply) from a viewer. In addition, the button objects BT2, BT4, and BT6 are objects to accept requests for details of the products from a viewer. Note that the button objects BT1 and BT2 are expected to be operated by a viewer while the streamer is presenting the portable game machine in the live video. Likewise, the button objects BT3 and BT4 are expected to be operated by a viewer while the streamer is presenting the projector in the live video. Further, the button objects BT5 and BT6 are expected to be operated by a viewer while the streamer is presenting the portable power supply in the live video. In addition, to each of the button objects BT1 to BT6, link information LK as illustrated in the above-described FIG. 4 is added. Although, in FIG. 13, a case where the button objects BT1 to BT6 are continuously synthesized within the image VA during distribution of the live video is illustrated as an example, it may be configured such that, every time the streamer changes a product to be presented, only objects corresponding to the product among the button objects BT1 to BT6 are synthesized within the image VA.

Returning to FIG. 12, the streamer 252 sends a live video with which an object is synthesized by the synthesizer 251 to the distribution server 100 for distribution to a viewer terminal 300. That is, the streamer 252 controls the sender/receiver 220 to send a live video with which an object is synthesized to the distribution server 100 and distributes the live video to a viewer terminal 300 via the distribution server 100.

Note that the afore-described CPU 401 or the like can function as the controller 250 having a configuration as described above.

The display 260 displays a live video with which an object is synthesized by the above-described synthesizer 251. Note that the afore-described display unit 411 can function as the display 260 as described above.

(Functional Configuration of Viewer Terminal 300)

Figure 14:
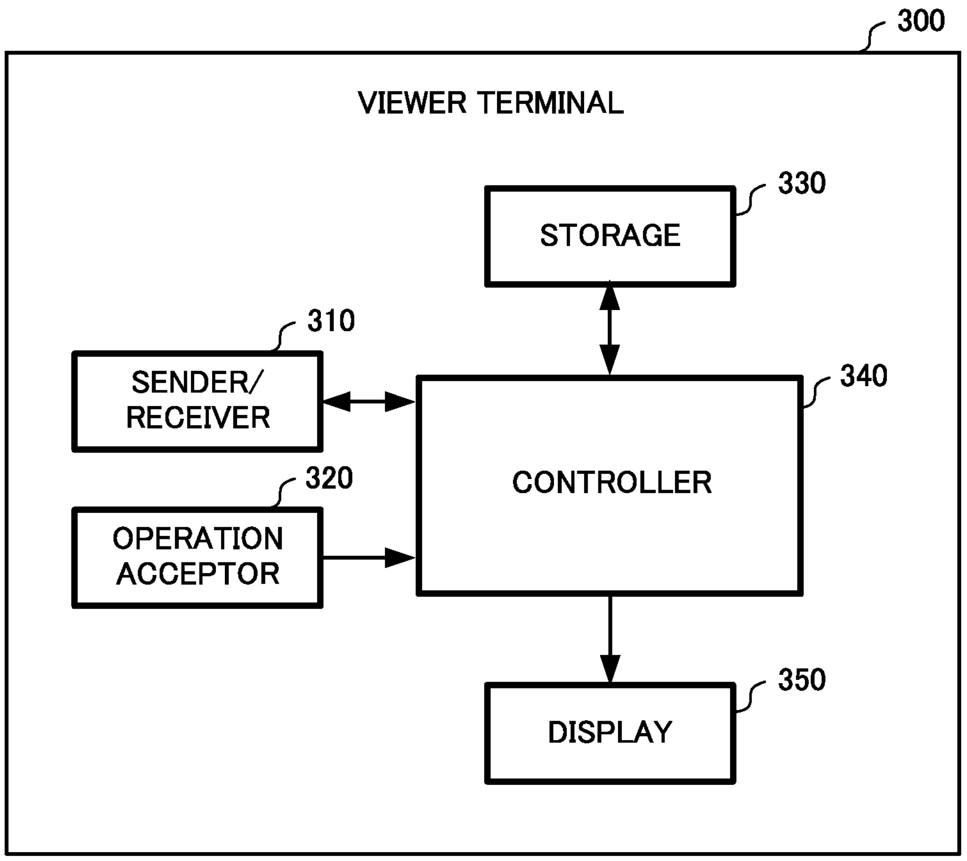
FIG. 14 is a block diagram illustrating an example of a functional configuration of a viewer terminal.

FIG. 14 is a block diagram illustrating an example of a functional configuration of each viewer terminal 300. As illustrated, the viewer terminal 300 includes a sender/receiver 310, an operation acceptor 320, a storage 330, a controller 340, and a display 350.

The sender/receiver 310 sends and receives various types of information to and from the distribution server 100 via the Internet 900. For example, the sender/receiver 310, controlled by the controller 340, receives a live video distributed from the distribution server 100. In addition, when an object (the above-described button objects BT1 to BT6 or the like) synthesized with a live video is operated by a viewer, the sender/receiver 310 sends access information (the above-described pieces of access information AC1 to AC3) to the distribution server 100. Note that the afore-described NIC 404 can function as the sender/receiver 310 as described above.

The operation acceptor 320 is a touch panel or a pointing device and accepts various types of operations from the viewer. For example, the operation acceptor 320 accepts an operation on an object synthesized to a live video. Note that the afore-described operation unit 410 can function as the operation acceptor 320 as described above.

The storage 330 stores various types of information required for processing in the viewer terminal 300. For example, the storage 330 stores various types of applications including a video viewing app and a browser app. More specifically, various types of applications are installed in the storage 330. Note that the video viewing app is, for example, an application to view a video distributed from the distribution server 100. In addition, a video distributed from the distribution server 100 may also be able to be viewed through the browser app. Note that the afore-described auxiliary storage 407 or the like can function as the storage 330 as described above.

The controller 340 controls the entire viewer terminal 300. For example, the controller 340 executes a video viewing app stored in the storage 330 and displays a live video or the like distributed from the distribution server 100 on the display 350. Note that the afore-described CPU 401 or the like can function as the controller 340 as described above.

Figure 15:
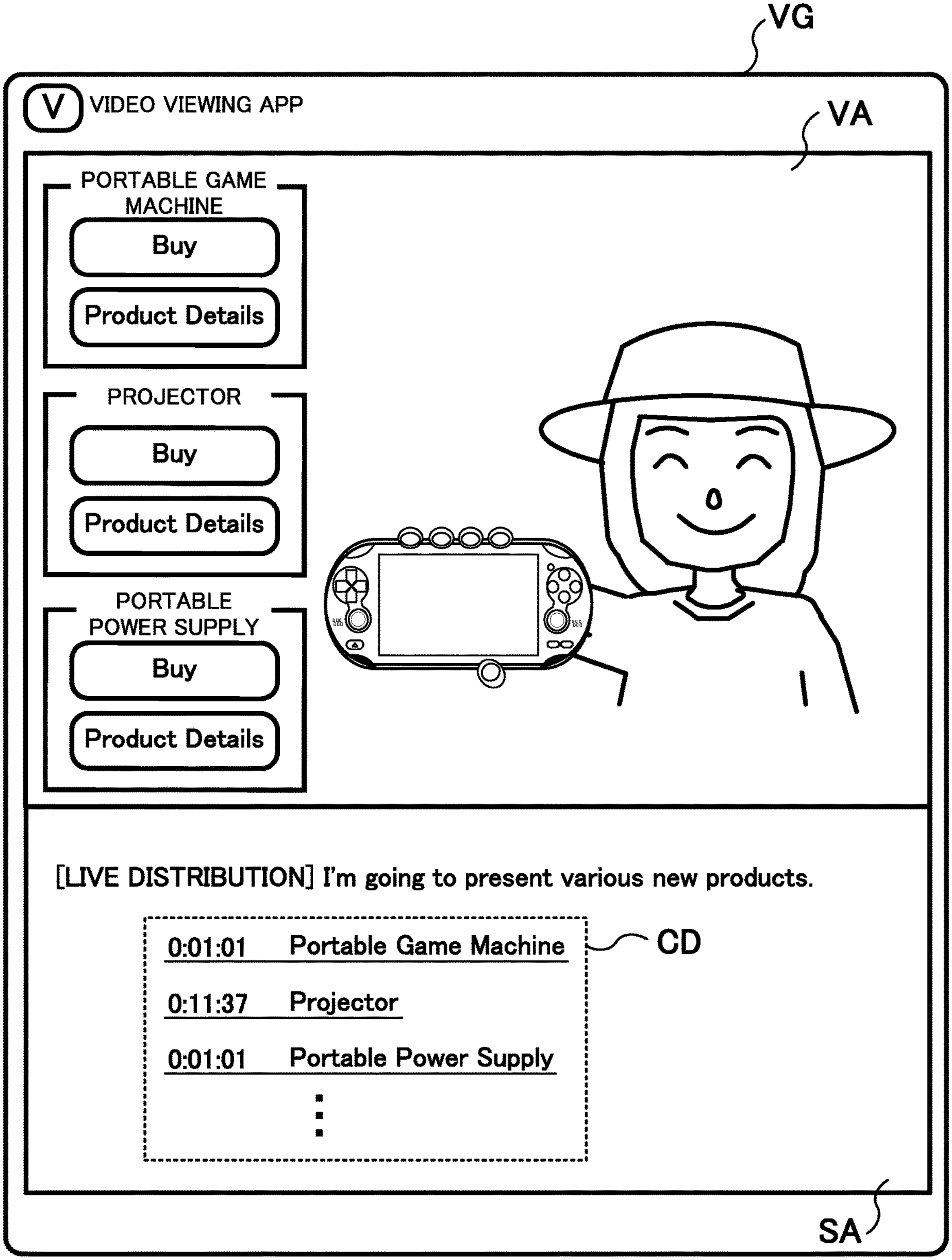
FIG. 15 is a schematic diagram illustrating an example of a viewing screen.

The display 350 displays a screen matching an application that the above-described controller 340 executes. For example, when the video viewing app is executed by the controller 340, the display 350 displays a viewing screen VG as illustrated in FIG. 15. In the viewing screen VG, an image VA for displaying a live video and a summary area SA for displaying a summary relating to the video are included. To the summary area SA, chapter information CD (a plurality of item rows) is added. The chapter information CD is linked to the addresses 134*e* in the above-described chapter management information 134, and a viewer can, by performing touch operation on the chapter information CD (one of the item rows), view the live video from the start position of a chapter. Note that the afore-described display unit 411 can function as the display 350 as described above.

(Operation of Distribution Server 100)

Figure 16:
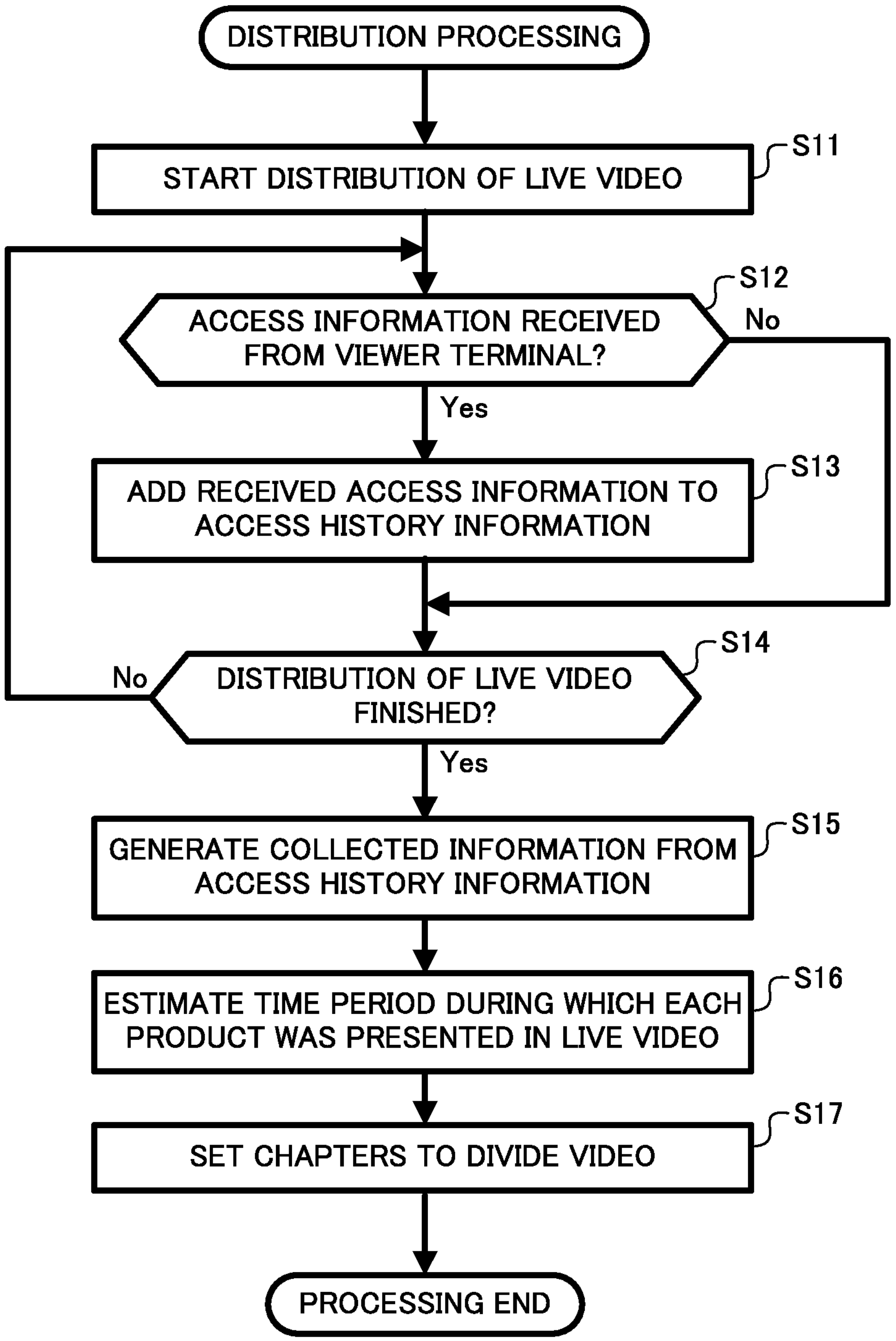
FIG. 16 is a flowchart for a description of distribution processing according to Embodiment 1.

Operation of the distribution server 100 is described below with reference to FIG. 16. FIG. 16 is a flowchart for a description of distribution processing according to Embodiment 1. The distribution processing is executed by the distribution server 100 when, for example, provision of a live video from a streamer terminal 200 is started.

First, the distribution server 100 starts distribution of a live video (step S11). That is, when the receiver 120 receives a live video provided by a streamer terminal 200, the controller 140 (distribution controller 141) controls the sender 110 to distribute the received live video to a viewer terminal 300. Note that, to the live video, an object is synthesized, as described above.

The distribution server 100 determines whether or not the distribution server 100 has received access information from the viewer terminal 300 (step S12). That is, the controller 140 determines whether or not the distribution server 100 has been accessed by the viewer terminal 300, caused by an operation by a viewer on the object synthesized to the live video and has received access information, which is passed as an argument, through the receiver 120.

When the distribution server 100 determines that the distribution server 100 has not received access information (step S12; No), the distribution server 100 advances the process to step S14, to be described later.

In contrast, when the distribution server 100 determines that the distribution server 100 has received access information (step S12; Yes), the distribution server 100 adds the received access information to the access history information 132 as illustrated in FIG. 6 (step S13).

The distribution server 100 determines whether or not the distribution of the live video is finished (step S14). That is, the controller 140 (distribution controller 141) determines whether or not the live video provided by the streamer terminal 200 is finished.

When the distribution server 100 determines that the distribution of the live video has not been finished (step S14; No), the distribution server 100 returns the process to the above-described step S12.

In contrast, when the distribution server 100 determines that the distribution of the live video is finished (step S14; Yes), the distribution server 100 generates collected information 133 as illustrated in FIG. 7 from the access history information 132 (step S15). For example, the controller 140 (collector 142) collects the numbers of accesses with respect to playback times (playback times 133*d*), which are grouped for each product (each product ID 133*b*), in the same live video (the same video ID 133*a*).

The estimator 100 estimates, based on the collected information 133 collected in the above-described step S15, a time period during which each product was presented in the live video (step S16). For example, the controller 140 (estimator 143) calculates distribution curves DC1, DC2, and the like of respective products, as illustrated in FIG. 9, from the collected information 133. The controller 140, by determining each boundary between distribution curves adjacent to each other on the time axis, estimates a time period during which each product was presented. In other words, a determined boundary serves as the termination time of a time period during which one product was presented and at the same time serves as the commencement time of a time period during which the other product was presented. Note that, since, regarding a product that was presented first in the live video, the commencement time of a time period during which the product was presented cannot be acquired from a boundary, the controller 140, for example, estimates a playback time at which the number of accesses first reaches a predetermined value on a distribution curve of the first product as the commencement time of the time period during which the product was presented. Likewise, since, regarding a product that was presented last in the live video, the termination time of a time period during which the product was presented cannot be acquired from a boundary, the controller 140, for example, estimates a playback time at which the number of accesses first falls to less than or equal to a predetermined value after having reached a peak on a distribution curve of the last product as the termination time of the time period during which the product was presented.

The distribution server 100 sets chapters to divide the live video (step S17). That is, the controller 140 (setter 144) sets chapters by generating, based on respective time periods estimated in the above-described step S16, chapter management information 134 as illustrated in FIG. 8 and adding the generated chapter management information 134 to summary information of the live video.

The distribution processing as described above enables a time period during which a product was presented in a live video to be estimated from access information acquired during distribution of the live video. That is, using a tendency that a viewer who is viewing a live video is highly likely to, while a product is being presented, operate an object synthesized to the live video to request purchase or the like of the product, a time period during which the product was presented in the live video is estimated. In other words, in the above-described distribution processing, it is possible to accumulate access information sent from a viewer terminal 300 in association with an operation on an object by a viewer and appropriately estimate, based on information (the above-described collected information 133) in which the accumulated access information is collected, a time period during which each product was presented in a live video.

Further, in the above-described distribution processing, chapters to divide a live video are set, based on respective estimated time periods. In addition, although, conventionally, chapter setting has been a heavy burden because a streamer or the like manually set a chapter, it is possible to eliminate such a human burden because, according to the present embodiment, the above-described configuration enables a chapter to be automatically set.

Although, in the above-described Embodiment 1, a case where, after distribution of a live video was finished, the collector 142 collects access history information 132 and generates collected information 133 as illustrated in FIG. 7 was described, the collector 142 may be configured to successively generate collected information 133 during distribution of the live video. In that case, the estimator 143 successively refers to the collected information 133 that is being generated and, when a boundary between distribution curves adjacent to each other on the time axis can be determined, determines the boundary. For example, when, as illustrated in the above-described FIG. 10, the peaks of the distribution curve DC1 and the distribution curve DC2 are used to determine a boundary, the boundary can be determined at a point of time when the peak of the distribution curve DC2 becomes apparent. In addition, when, as illustrated in the above-described FIG. 11, a point at which the distribution curve DC1 and the distribution curve DC2 cross each other is used to determine a boundary, the boundary can be determined at a point of time when the crossing between the distribution curve DC1 and the distribution curve DC2 becomes apparent. In other words, the estimator 143 is capable of estimating, from each boundary that has been successively determined during distribution of a live video in this way, a time period during which a product was presented up to the point of time in the live video.

Further, the setter 144 may be configured to set chapters from time periods that were successively estimated during distribution of a live video. In this case, it becomes possible for a viewer who has belatedly started viewing a live video to initiate chasing playback by operating chapter information (the chapter information CD in the summary area SA) that has been partially set or moving a seek bar to a chapter.

Although, in the above-described Embodiment 1, a case where, based on generated chapter management information, chapter information CD is added to the summary area SA as illustrated in FIG. 15 was described, it may be configured such that a message including such chapter information CD can be posted to a social networking service (SNS). A user who, after a message including chapter information CD has been posted to an SNS, has viewed the message performing operation on the chapter information CD causes, for example, a video viewing app to be started and enables the live video to be viewed from the start position of the chapter in the same manner as described above.

Embodiment 2

Although, in the above-described Embodiment 1, a case where the distribution server 100 estimates a time period during which a product was presented in a live video was described, it may be configured such that, in place of the distribution server 100, another server device estimates a time period during which a product was presented in a live video. A distribution system in which a management server that is different from the distribution server 100 estimates a time period during which a product was presented in a live video is described below.

Figure 17:
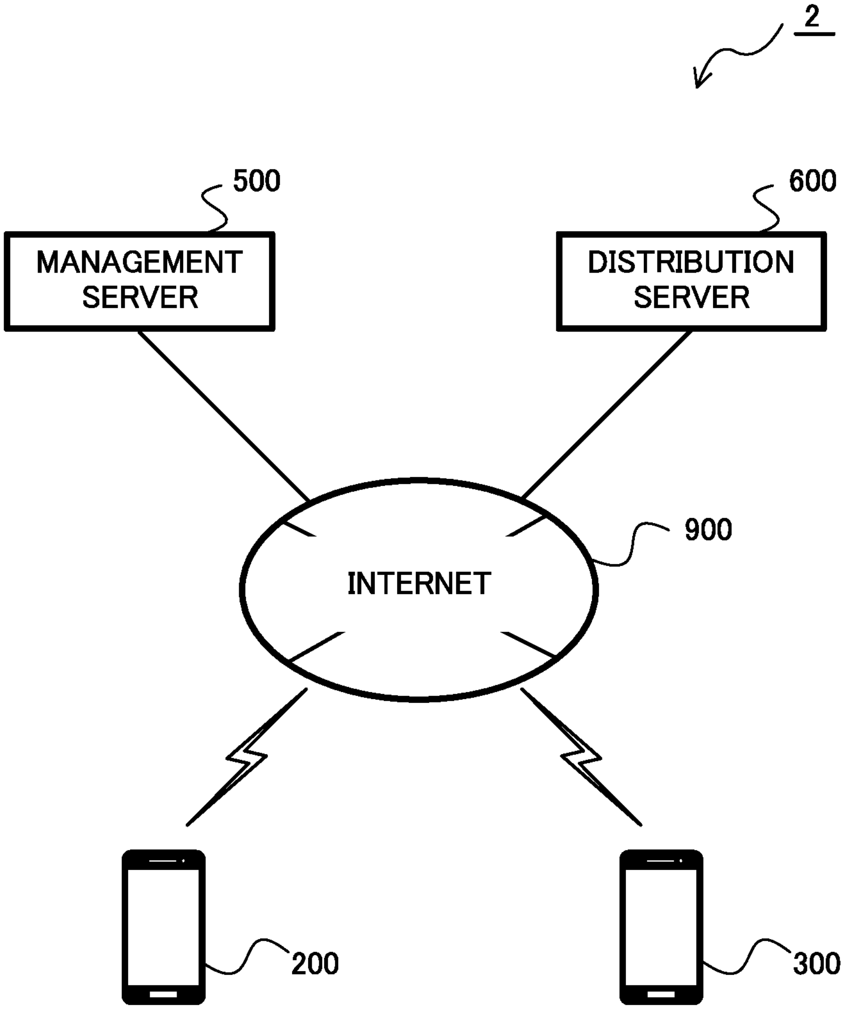
FIG. 17 is a schematic diagram illustrating an example of an overall configuration of a distribution system according to Embodiment 2 of the present disclosure.

FIG. 17 is a schematic diagram illustrating an example of an overall configuration of a distribution system 2 according to Embodiment 2 of the present disclosure. In the distribution system 2, a management server 500, a distribution server 600, a streamer terminal 200, and a viewer terminal 300 are connected to one another in a communicable manner via the Internet 900, as an example. Note that the streamer terminal 200 and the viewer terminal 300 have the same configurations as the streamer terminal 200 and the viewer terminal 300 in the distribution system 1 according to the above-described Embodiment 1, respectively.

The management server 500 is, for example, a server device and estimates a time period during which a product was presented in a live video in collaboration with the distribution server 600. Note that the management server 500 may be configured to save (record) a live video distributed from the distribution server 600.

The distribution server 600 is, for example, a server device and distributes a live video provided by a streamer to a viewer terminal 300. As with Embodiment 1, with the live video, an object (button objects BT1 to BT6 or the like) to accept, from a viewer, purchase or the like of a product that a streamer presents is also synthesized. In addition, as with Embodiment 1, link information LK as illustrated in the above-described FIG. 4 is added to an object. Note that, in address information AD1 in the link information LK, a URL of the management server 500 is set.

Note that the management server 500 and the distribution server 600 are also achieved by an information processing device 400 in the above-described FIG. 2. That is, when the information processing device 400 is powered on, a program that cause the information processing device 400 to function as the management server 500 or the distribution server 600 according to Embodiment 2 is executed, and the management server 500 or the distribution server 600 according to Embodiment 2 is thereby achieved.

(Functional Configuration of Management Server 500)

Figure 18:
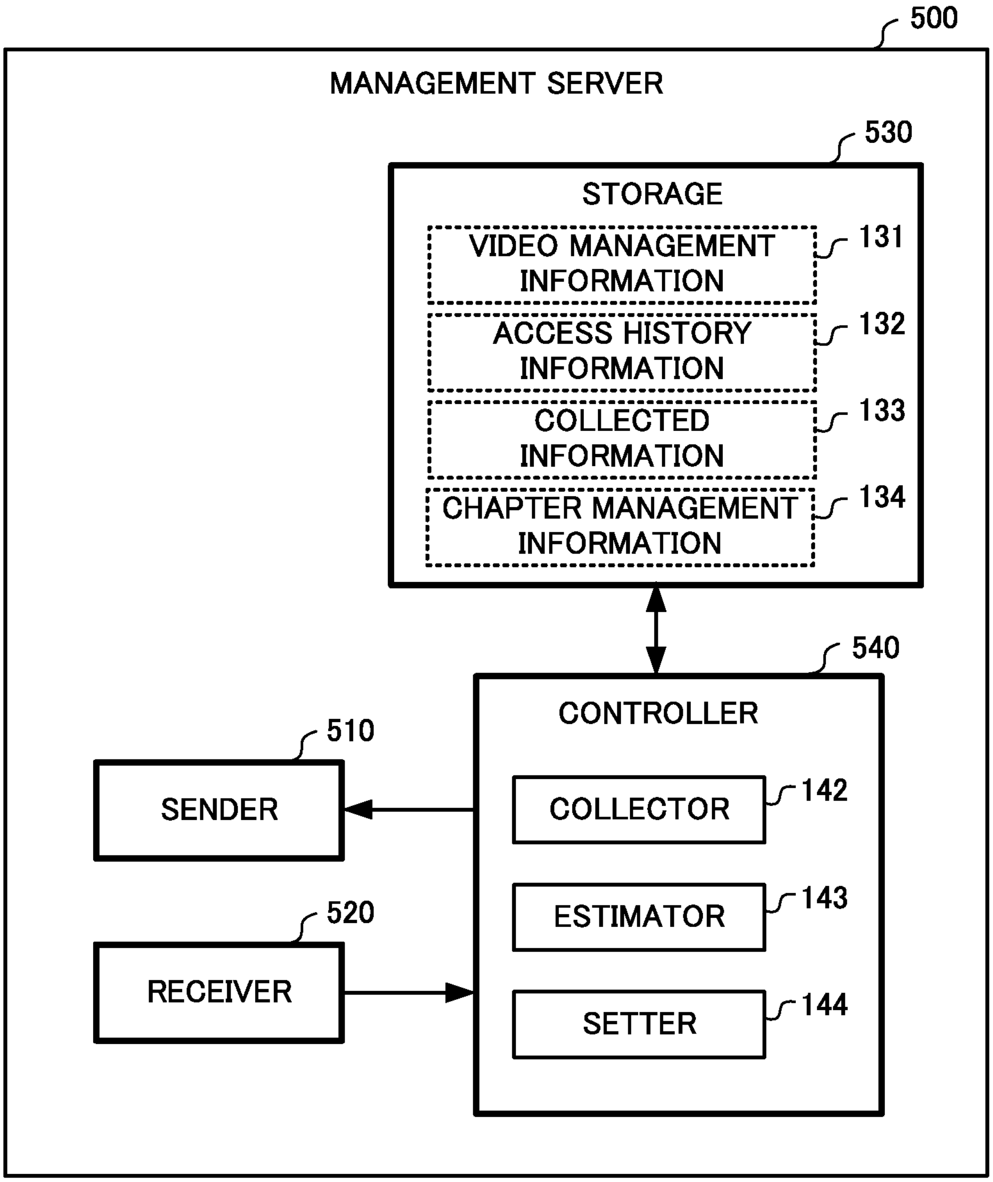
FIG. 18 is a block diagram illustrating an example of a functional configuration of a management server according to Embodiment 2.

FIG. 18 is a block diagram illustrating an example of a functional configuration of the management server 500 according to Embodiment 2. As illustrated, the management server 500 includes a sender 510, a receiver 520, a storage 530, and a controller 540.

The sender 510 sends various types of information addressed to a viewer terminal 300 and the like via the Internet 900. In Embodiment 2, since, when an object synthesized to a live video is operated by a viewer, access to the management server 500 is performed from a viewer terminal 300 in accordance with link information LK (note that, in the address information AD1 in the link information LK, the address of the management server 500 is set), the receiver 520 is to receive pieces of access information AC1 to AC3 and address information AD2 as arguments. The sender 510, by sending response information acquired from a sales server that is accessed in accordance with the address information AD2 received as an argument to the viewer terminal 300, redirects the viewer terminal 300 to the sales server. Note that the afore-described NIC 404 can function as the sender 510 as described above.

The receiver 520 receives various types of information sent from a viewer terminal 300 and the like via the Internet 900. For example, when an object synthesized to a live video is operated by a viewer, the receiver 520 receives access information and the like sent from a viewer terminal 300. In other words, the receiver 520 also receives pieces of access information AC1 to AC3 and address information AD2 as illustrated in FIG. 4 as arguments. In addition, the receiver 520 receives start information indicating that distribution of a live video is started and end information indicating that distribution of a live video is finished from the distribution server 600. Note that the afore-described NIC 404 can function as the receiver 520 as described above.

The storage 530 stores various types of information required for processing in the management server 500. For example, the storage 530 stores video management information 131, access history information 132, collected information 133, and chapter management information 134. In other words, the storage 530 stores video management information 131 as illustrated in FIG. 5, access history information 132 as illustrated in FIG. 6, collected information 133 as illustrated in FIG. 7, and chapter management information 134 as illustrated in FIG. 8. Note that the afore-described auxiliary storage 407 or the like can function as the storage 130 as described above.

The controller 540 controls the entire management server 500. The controller 540 includes, for example, a collector 142, an estimator 143, and a setter 144. Note that the collector 142, the estimator 143, and the setter 144 have the same configurations as the collector 142, the estimator 143, and the setter 144 in the distribution server 100 (controller 140) in the above-described FIG. 3, respectively. Note that the afore-described CPU 401 or the like can function as the controller 540 having a configuration as described above.

(Functional Configuration of Distribution Server 600)

Figure 19:
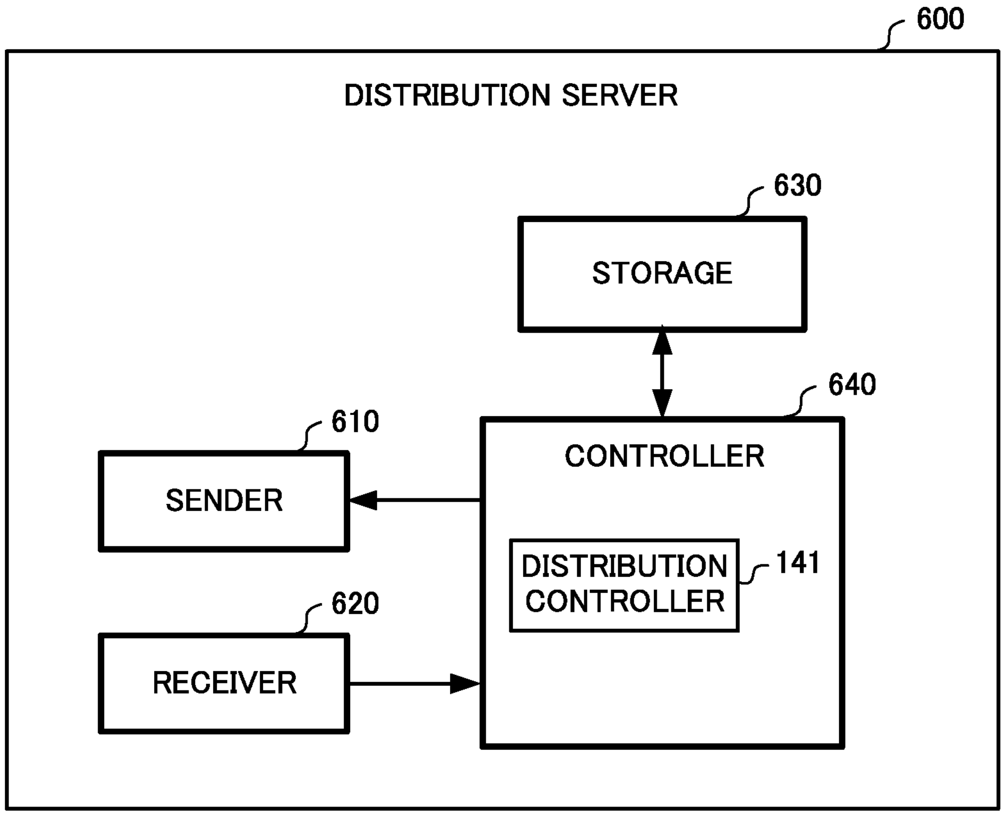
FIG. 19 is a block diagram illustrating an example of a functional configuration of a distribution server according to Embodiment 2.

FIG. 19 is a block diagram illustrating an example of a functional configuration of the distribution server 600 according to Embodiment 2. As illustrated, the distribution server 600 includes a sender 610, a receiver 620, a storage 630, and a controller 640.

The sender 610 sends various types of information addressed to a viewer terminal 300 and the like via the Internet 900. For example, when the receiver 620 receives a live video provided by a streamer terminal 200, the sender 610, controlled by the controller 640, distributes the received live video to a viewer terminal 300. In addition, the sender 610 sends start information indicating that distribution of a live video is started and end information indicating that distribution of a live video is finished to the management server 500. Note that the afore-described NIC 404 can function as the sender 610 as described above.

The receiver 620 receives various types of information sent from a streamer terminal 200 and the like via the Internet 900. For example, the receiver 620 receives a live video provided by a streamer terminal 200. Note that the afore-described NIC 404 can function as the receiver 620 as described above.

The storage 630 stores various types of information required for processing in the distribution server 600. For example, the storage 630 stores an ID, a password, and the like of a viewer who uses a viewer terminal 300. The storage 630 also saves (records) a live video in parallel with distribution of the live video. In other words, the controller 640, while distributing a live video, saves the live video in the storage 630. Note that the afore-described auxiliary storage 407 or the like can function as the storage 630 as described above.

The controller 640 controls the entire distribution server 600. The controller 140 includes, for example, a distribution controller 141. Note that the distribution controller 141 has the same configuration as the distribution controller 141 in the distribution server 100 (controller 140) in the above-described FIG. 3. Note that the afore-described CPU 401 or the like can function as the controller 640 having a configuration as described above.

(Operation of Management Server 500)

Figure 20:
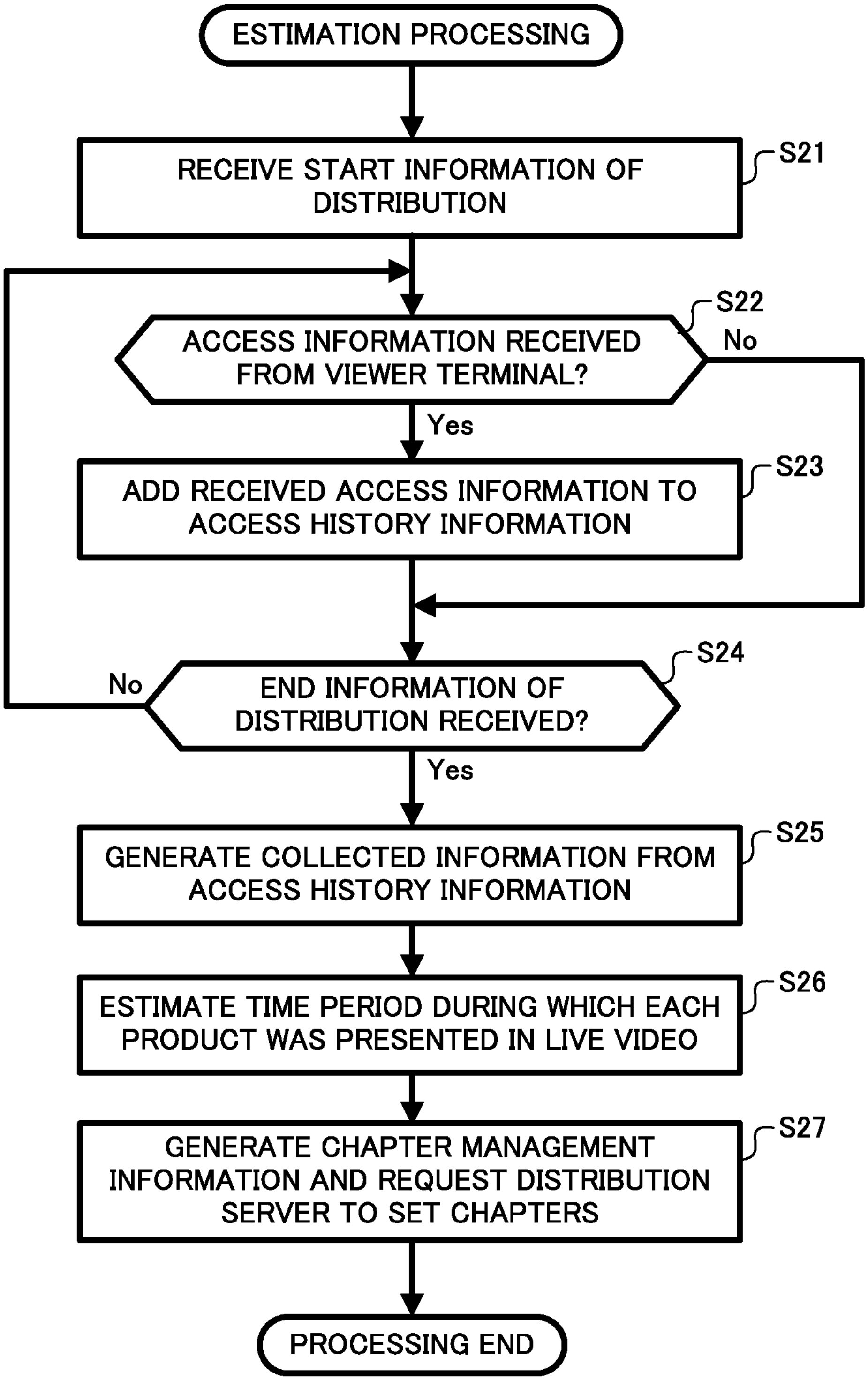
FIG. 20 is a flowchart for a description of estimation processing according to Embodiment 2.

Operation of the management server 500 is described below with reference to FIG. 20. FIG. 20 is a flowchart for a description of estimation processing according to Embodiment 1. The estimation processing is executed by the management server 500 when, for example, provision of a live video from a streamer terminal 200 to the distribution server 600 is started.

First, the management server 500 receives start information of distribution (step S21). That is, the receiver 520 receives start information sent from the distribution server 600 and indicating that distribution of a live video is started.

The management server 500 determines whether or not the management server 500 has received access information from a viewer terminal 300 (step S22). That is, the controller 540 determines whether or not the management server 500 has been accessed by the viewer terminal 300, caused by an operation by a viewer on an object synthesized to the live video and has received access information, which is passed as an argument, through the receiver 520.

When the management server 500 determines that the management server 500 has not received access information (step S22; No), the management server 500 advances the process to step S24, to be described later.

In contrast, when the management server 500 determines that the management server 500 has received access information (step S22; Yes), the management server 500 adds the received access information to access history information 132 as illustrated in FIG. 6 (step S23).

The management server 500 determines whether or not the management server 500 has received end information of distribution (step S24). That is, the controller 540 determines whether or not the receiver 520 has received end information indicating that the distribution of the live video is finished.

When the management server 500 determines that the management server 500 has not received end information of distribution (step S24; No), the management server 500 returns the process to the above-described step S22.

In contrast, when the management server 500 determines that the management server 500 has received end information of distribution (step S24; Yes), the management server 500 generates collected information 133 as illustrated in FIG. 7 from the access history information 132 (step S25). For example, the controller 540 (collector 142) collects the numbers of accesses with respect to playback times (playback times 133*d*), which are grouped for each product (each product ID 133*b*), in the same live video (the same video ID 133*a*).

The management server 500 estimates, based on the collected information 133 collected in the above-described step S25, a time period during which each product was presented in the live video (step S26). For example, the controller 540 (estimator 143) calculates distribution curves DC1, DC2, and the like of respective products, as illustrated in FIG. 9, from the collected information 133. The controller 540, by determining each boundary between distribution curves adjacent to each other on the time axis, estimates a time period during which each product was presented.

The management server 500 generates chapter management information and requests the distribution server 600 to set chapters (step S27). That is, the controller 540 (setter 144) generates, based on the respective time periods estimated in the above-described step S26, chapter management information 134 as illustrated in FIG. 8 and requests the distribution server 600 to set chapters, based on the generated chapter management information 134.

The estimation processing as described above enables a time period during which a product was presented in a live video to be estimated from access information acquired during distribution of the live video. In other words, in the above-described estimation processing, it is possible to accumulate access information sent from a viewer terminal 300 in association with an operation on an object by a viewer and appropriately estimate, based on information (the above-described collected information 133) in which the accumulated access information is collected, a time period during which each product was presented in a live video.

Further, in the above-described estimation processing, the controller 540 generates, based on respective estimated time periods, the chapter management information 134 and requests the distribution server 600 to set chapters, based on the generated chapter management information 134. In addition, although, conventionally, chapter setting has been a heavy burden because a streamer or the like manually set a chapter, it is possible to eliminate such a human burden because, according to the present embodiment, the above-described configuration enables a chapter to be automatically set.

OTHER EMBODIMENTS

In the above-described Embodiments 1 and 2, programs that are executed by the distribution servers 100, the management server 500, and the like can be stored in a computer-readable recording medium, such as a compact disc read only memory (CD-ROM), a DVD, a magneto-optical disk (MO), a USB memory, and a memory card, and distributed. By installing such programs in a specific or general-purpose computer, it is possible to cause the computer to function as the distribution servers 100 and the management server 500 in the above-described Embodiments 1 and 2.

In addition, it may be configured such that the above-described programs are stored in a disk device that a server device on a communication network, such as the Internet, has and are, for example, superimposed on a carrier wave and downloaded to a computer. In addition, by starting and executing programs while transferring the programs via a communication network, the above-described processing can be achieved. Further, by causing a server device to execute all or some of programs and a computer to execute a program while sending and receiving information relating to the processing in the server device via a communication network, the above-described processing can also be achieved.

Note that, when the above-described functions are achieved by the operating system (OS) sharing some of the functions, are achieved by collaboration between the OS and applications, or the like, only programs other than the OS may be stored in the above-described recording medium and distributed or may be downloaded to a computer.

[1]

A server device including one or more processors, wherein at least one processor of the one or more processors executes processing of:

receiving, from each of a plurality of terminals which are playing a distributed live video, a piece of access information sent in response to an operation on one of a plurality of objects respectively associated with a plurality of products presented in the live video;

collecting video identification information identifying the live video, product identification information identifying a product associated with the operated object, and time information indicating a playback time of the live video at the time of operation being performed on the object, the video identification information, the product identification information, and the time information being included in each of the received pieces of access information; and estimating, based on the collected video identification information, product identification information, and time information, a time period during which each of the plurality of products was presented in the live video.

[2]

The server device according to [1], wherein, in the estimation of each time period, the server device aggregates the pieces of access information including the same video identification information and the same product identification information into a same group and estimates, based on a distribution of numbers of accesses with respect to the playback times calculated for each of the aggregated groups, the time period corresponding to each of the plurality of products.

[3]

The server device according to [2], wherein, in the estimation of each time period, the server device calculates a distribution curve of numbers of accesses with respect to the playback times for each of the aggregated groups and, by determining each boundary between the distribution curves adjacent to each other on a time axis, estimates the time period corresponding to each of the plurality of products.

[4]

The server device according to [1], wherein at least one processor of the one or more processors further executes processing of setting, based on each of the estimated time periods, one or more chapters to divide the live video into segments.

[5]

The server device according to [4], wherein, in the setting of the one or more chapters, the server device generates, for each of the chapters, chapter information associated with a character string related to a corresponding product.

[6]

An estimation method including by a computer:

receiving, from each of a plurality of terminals which are playing a distributed live video, a piece of access information sent in response to an operation on one of a plurality of objects respectively associated with a plurality of products presented in the live video;

collecting video identification information identifying the live video, product identification information identifying a product associated with the operated object, and time information indicating a playback time of the live video at the time of operation being performed on the object, the video identification information, the product identification information, and the time information being included in each of the received pieces of access information; and estimating, based on the collected video identification information, product identification information, and time information, a time period during which each of the plurality of products was presented in the live video.

[7]

A distribution system including: a server device; and a plurality of terminals, wherein at least one processor of one or more processors included in the server device executes processing of:

receiving, from each of the plurality of terminals which are playing a distributed live video, a piece of access information sent in response to an operation on one of a plurality of objects respectively associated with a plurality of products presented in the live video;

collecting video identification information identifying the live video, product identification information identifying a product associated with the operated object, and time information indicating a playback time of the live video at the time of operation being performed on the object, the video identification information, the product identification information, and the time information being included in each of the received pieces of access information; and estimating, based on the collected video identification information, product identification information, and time information, a time period during which each of the plurality of products was presented in the live video.

INDUSTRIAL APPLICABILITY

The present disclosure is suitably applicable to distribution of a video in which a chapter is set based on reaction of a streamer during distribution.

REFERENCE SIGNS LIST

1, 2 Distribution system
100, 600 Distribution server
110, 610 Sender
120, 620 Receiver
130, 630 Storage
131 Video management information
132 Access history information
133 Collected information
134 Chapter management information
140, 640 Controller
141 Distribution controller
142 Collector
143 Estimator
144 Setter
200 Streamer terminal
210 Image capturer
220 Sender/receiver
230 Operation acceptor
240 Storage
250 Controller
251 Synthesizer
252 Streamer
260 Display
300 Viewer terminal
310 Sender/receiver
320 Operation acceptor
330 Storage
340 Controller
350 Display
400 Information processing device
401 CPU
402 ROM
403 RAM
404 NIC
405 Image processor
406 Sound processor
407 Auxiliary storage
408 Interface
409 Image capturing unit
410 Operation unit
411 Display unit
500 Management server
510 Sender
520 Receiver
530 Storage
540 Controller
900 Internet

The invention claimed is:

1. A server device, comprising:

one or more processors, wherein at least one processor of the one or more processors executes processing of:

receiving, from each of a plurality of terminals which are playing a distributed live video, a piece of access information sent in response to an operation on one of a plurality of objects respectively associated with a plurality of products presented in the live video;

collecting video identification information identifying the live video, product identification information identifying a product associated with the operated object, and time information indicating a playback time of the live video at the time of operation being performed on the operated object, the video identification information, the product identification information, and the time information being included in each of the received pieces of access information; and estimating, based on the collected video identification information, product identification information, and time information, a time period during which each of the plurality of products was presented in the live video, wherein the estimating comprises:

aggregating the pieces of access information including the same video identification information and the same product identification information into a same group; and calculating a distribution curve of numbers of accesses with respect to the playback times for each of the aggregated groups; and based on determining each boundary between the distribution curves adjacent to each other on a time axis, estimate the time period corresponding to each of the plurality of products.

2. The server device according to claim 1, wherein at least one processor of the one or more processors further executes processing of setting, based on each of the estimated time periods, one or more chapters to divide the live video into segments.

3. The server device according to claim 2, wherein, in the setting of the one or more chapters, the server device generates, for each of the chapters, chapter information associated with a character string related to a corresponding product.

4. An estimation method, comprising by a computer:

receiving, from each of a plurality of terminals which are playing a distributed live video, a piece of access information sent in response to an operation on one of a plurality of objects respectively associated with a plurality of products presented in the live video;

collecting video identification information identifying the live video, product identification information identifying a product associated with the operated object, and time information indicating a playback time of the live video at the time of operation being performed on the operated object, the video identification information, the product identification information, and the time information being included in each of the received pieces of access information; and estimating, based on the collected video identification information, product identification information, and time information, a time period during which each of the plurality of products was presented in the live video, wherein the estimating comprises:

aggregating the pieces of access information including the same video identification information and the same product identification information into a same group; and calculating a distribution curve of numbers of accesses with respect to the playback times for each of the aggregated groups; and based on determining each boundary between the distribution curves adjacent to each other on a time axis, estimate the time period corresponding to each of the plurality of products.

5. A distribution system, comprising:

a server device; and a plurality of terminals, wherein at least one processor of one or more processors included in the server device executes processing of:

receiving, from each of the plurality of terminals which are playing a distributed live video, a piece of access information sent in response to an operation on one of a plurality of objects respectively associated with a plurality of products presented in the live video;

collecting video identification information identifying the live video, product identification information identifying a product associated with the operated object, and time information indicating a playback time of the live video at the time of operation being performed on the operated object, the video identification information, the product identification information, and the time information being included in each of the received pieces of access information; and estimating, based on the collected video identification information, product identification information, and time information, a time period during which each of the plurality of products was presented in the live video, wherein the estimating comprises:

aggregating the pieces of access information including the same video identification information and the same product identification information into a same group; and calculating a distribution curve of numbers of accesses with respect to the playback times for each of the aggregated groups; and based on determining each boundary between the distribution curves adjacent to each other on a time axis, estimate the time period corresponding to each of the plurality of products.

* * * * *